United States Patent
Ouyang et al.

(10) Patent No.: US 9,047,268 B2
(45) Date of Patent: Jun. 2, 2015

(54) CHARACTER AND WORD LEVEL LANGUAGE MODELS FOR OUT-OF-VOCABULARY TEXT INPUT

(71) Applicant: Google Inc., Mountain View, CA (US)

(72) Inventors: Yu Ouyang, San Jose, CA (US);
Shumin Zhai, Los Altos, CA (US);
Ciprian Ioan Chelba, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/774,656

(22) Filed: Feb. 22, 2013

(65) Prior Publication Data

US 2014/0214405 A1    Jul. 31, 2014

Related U.S. Application Data

(60) Provisional application No. 61/759,274, filed on Jan. 31, 2013.

(51) Int. Cl.
G06F 17/27        (2006.01)
G06F 3/023        (2006.01)
G06F 3/0488       (2013.01)
G10L 15/06        (2013.01)
(Continued)

(52) U.S. Cl.
CPC ............ *G06F 17/276* (2013.01); *G06F 17/273* (2013.01); *G06F 3/0237* (2013.01); *G06F 3/04886* (2013.01)

(58) Field of Classification Search
USPC ......... 345/172, 169; 707/10; 704/9, 245, 276, 704/254, 251, 240, 231; 715/773, 816, 257; 382/229
See application file for complete search history.

(56) References Cited

U.S. PATENT DOCUMENTS 4,903,206 A    2/1990  Itoh et al.
5,764,241 A    6/1998  Elliott et al.
(Continued)

FOREIGN PATENT DOCUMENTS

WO    2005064587 A2    7/2005
WO    2011113057 A1    9/2011
WO    2014066106 A2    5/2014

OTHER PUBLICATIONS

Goodman, et al. "Language Modeling for Soft Keyboards", American Association for Artificial Intelligence, 2002, 6 pps.
(Continued)

*Primary Examiner* — Pierre-Louis Desir
*Assistant Examiner* — Neeraj Sharma
(74) *Attorney, Agent, or Firm* — Shumaker & Sieffert, P.A.

(57) ABSTRACT

A computing device determines, based at least in part on indications of user input, scores for a first set of candidate strings and a second set of candidate strings. Each candidate string from the first set of candidate strings is in a lexicon. Candidate strings from the second set of candidate strings are not necessarily in the lexicon. The computing device determines the scores for the first set of candidate strings based on probabilities of the candidate strings being entered. For each candidate string from the second set of candidate strings, the computing device determines the scores for the candidate string based on probabilities of characters of the candidate string being entered. The computing device selects a candidate string based on the scores for the first and second sets of candidate strings and outputs, for display at the display device, the selected candidate string.

18 Claims, 13 Drawing Sheets

(51) Int. Cl.

| | | |
|---|---|---|
| G10L 15/00 | (2013.01) | |
| G10L 25/00 | (2013.01) | |
| G06F 3/02 | (2006.01) | |
| G06F 3/048 | (2013.01) | |
| G06F 17/00 | (2006.01) | |
| G06K 9/72 | (2006.01) | |

(56) References Cited

U.S. PATENT DOCUMENTS

| | | | |
|---|---|---|---|
| 5,805,911 | A | 9/1998 | Miller |
| 5,829,002 | A * | 10/1998 | Priest ........................ 1/1 |
| 5,923,778 | A | 7/1999 | Chen et al. |
| 5,943,674 | A | 8/1999 | Schofield |
| 6,119,079 | A | 9/2000 | Wang et al. |
| 6,286,064 | B1 | 9/2001 | King et al. |
| 6,292,179 | B1 | 9/2001 | Lee |
| 6,525,749 | B1 | 2/2003 | Moran et al. |
| 6,654,733 | B1 | 11/2003 | Goodman et al. |
| 6,801,190 | B1 | 10/2004 | Robinson et al. |
| 7,030,863 | B2 | 4/2006 | Longe et al. |
| 7,035,788 | B1 | 4/2006 | Nakajima et al. |
| 7,042,443 | B2 | 5/2006 | Woodard et al. |
| 7,075,520 | B2 | 7/2006 | Williams |
| 7,088,345 | B2 | 8/2006 | Robinson et al. |
| 7,098,896 | B2 | 8/2006 | Kushler et al. |
| 7,145,554 | B2 | 12/2006 | Bachmann |
| 7,151,530 | B2 | 12/2006 | Roeber et al. |
| 7,199,786 | B2 | 4/2007 | Suraqui |
| 7,250,938 | B2 | 7/2007 | Kirkland et al. |
| 7,251,367 | B2 | 7/2007 | Zhai |
| 7,277,088 | B2 | 10/2007 | Robinson et al. |
| 7,385,591 | B2 * | 6/2008 | Goodman ................. 345/172 |
| 7,453,439 | B1 | 11/2008 | Kushler et al. |
| 7,508,324 | B2 | 3/2009 | Suraqui |
| 7,574,356 | B2 * | 8/2009 | Parthasarathy ............ 704/231 |
| 7,634,408 | B1 * | 12/2009 | Mohri ....................... 704/251 |
| 7,706,616 | B2 | 4/2010 | Kristensson et al. |
| 7,716,579 | B2 | 5/2010 | Gunn et al. |
| 7,750,891 | B2 | 7/2010 | Stephanick et al. |
| 7,895,031 | B2 | 2/2011 | Nakajima et al. |
| 7,921,361 | B2 | 4/2011 | Gunn et al. |
| 7,996,224 | B2 * | 8/2011 | Bacchiani et al. ......... 704/254 |
| 8,036,878 | B2 | 10/2011 | Assadollahi |
| 8,077,983 | B2 * | 12/2011 | Qiu et al. .................. 382/229 |
| 8,135,582 | B2 | 3/2012 | Suraqui |
| 8,423,916 | B2 | 4/2013 | Chihara et al. |
| 8,473,843 | B2 * | 6/2013 | Lundy et al. .............. 715/257 |
| 2002/0188448 | A1 * | 12/2002 | Goodman et al. ......... 704/254 |
| 2003/0011574 | A1 | 1/2003 | Goodman |
| 2004/0140956 | A1 | 7/2004 | Kushler et al. |
| 2005/0192802 | A1 * | 9/2005 | Robinson et al. ......... 704/240 |
| 2006/0095263 | A1 * | 5/2006 | Kawasaki et al. ......... 704/257 |
| 2006/0119582 | A1 | 6/2006 | Ng et al. |
| 2006/0129397 | A1 * | 6/2006 | Li et al. .................... 704/245 |
| 2006/0176283 | A1 * | 8/2006 | Suraqui .................... 345/169 |
| 2006/0206313 | A1 * | 9/2006 | Xu et al. ..................... 704/10 |
| 2007/0074131 | A1 * | 3/2007 | Assadollahi .............. 715/816 |
| 2007/0089070 | A1 * | 4/2007 | Jaczyk ...................... 715/816 |
| 2008/0154576 | A1 * | 6/2008 | Wu et al. ...................... 704/2 |
| 2008/0316183 | A1 | 12/2008 | Westerman et al. |
| 2009/0099841 | A1 * | 4/2009 | Chen ............................ 704/9 |
| 2009/0113299 | A1 * | 4/2009 | Chung ...................... 715/702 |
| 2009/0216690 | A1 | 8/2009 | Badger |
| 2010/0020025 | A1 | 1/2010 | Lemort et al. |
| 2010/0153880 | A1 | 6/2010 | Dinn |
| 2010/0315266 | A1 | 12/2010 | Gunawardana et al. |
| 2011/0063231 | A1 | 3/2011 | Jakobs et al. |
| 2011/0071834 | A1 * | 3/2011 | Kristensson et al. ......... 704/251 |
| 2011/0078613 | A1 * | 3/2011 | Bangalore ................. 715/773 |
| 2011/0154193 | A1 * | 6/2011 | Creutz et al. .............. 715/261 |
| 2011/0208507 | A1 * | 8/2011 | Hughes ........................ 704/9 |
| 2011/0320978 | A1 | 12/2011 | Horodezky et al. |
| 2012/0029910 | A1 * | 2/2012 | Medlock et al. ............... 704/9 |
| 2012/0036469 | A1 | 2/2012 | Suraqui |
| 2012/0259615 | A1 * | 10/2012 | Morin et al. .................. 704/9 |
| 2012/0324391 | A1 * | 12/2012 | Tocci ........................ 715/773 |
| 2013/0046544 | A1 * | 2/2013 | Kay et al. .................. 704/275 |
| 2013/0125037 | A1 * | 5/2013 | Pasquero et al. .......... 715/773 |
| 2013/0173611 | A1 | 7/2013 | Wald et al. |

OTHER PUBLICATIONS

Goodman, et al. "Lanuage Modeling for Soft Keyboards", IUI'02, Jan. 13-16, 2002, 2 pps.

Nakov, "Combing Word-Level and Character-Level Models for Machine Translation Between Closely-Related Lanuages", Proceedings of the 50th Annual Meeting of the Association for Computational Linguistics, Jul. 8-14, 2012, pp. 301-305.

U.S. Appl. No. 60/430,338, by Daniel Suraqui, filed Nov. 29, 2002.

U.S. Appl. No. 60/505,724, by Daniel Suraqui, filed Sep. 22, 2003.

Pirinen et al., "Creating and Weighting Hunspell Dictionaries as Finite-State Automata," Investigationes Linguisticae 19 Jan. 1, 2010, 16 pp.

Bassil et al., "Parallel Spell-Checking Algorithm Based on Yahoo! N-Grams Dataset," International Journal of Research and Reviews in Computer Science, vol. 3, No. 1, Feb. 2012, 8 pp.

International Search Report and Written Opinion of International application No. PCT/US2014/011893, mailed Aug. 26, 2014, 16 pp.

Bazzi, et al., "Modeling Out of Vocabulary Words for Robust Speech Recognition," Spoken Language Systems Group, Laboratory for Computer Science, Oct. 16, 2000, 4 pp.

* cited by examiner

CHARACTER AND WORD LEVEL LANGUAGE MODELS FOR OUT-OF-VOCABULARY TEXT INPUT

This application claims the benefit of U.S. Provisional Patent Application No. 61/759,274, filed Jan. 31, 2013, the entire content of which is incorporated herein by reference.

BACKGROUND

Some computing devices (e.g., mobile phones, tablet computers, etc.) may provide a graphical keyboard as part of a graphical user interface for composing text using a presence-sensitive display (e.g., a screen). The graphical keyboard may enable a user of the computing device to enter text (e.g., an e-mail, a text message, or a document, etc.). For instance, a presence-sensitive display of a computing device may output a graphical (or "soft") keyboard that enables the user to enter data by indicating (e.g., by tapping) keys displayed at the presence-sensitive display.

In some cases, a computing device may present a continuous-gesture graphical keyboard (sometimes referred to as a "combo gesture keyboard," or "gesture keyboard") with which a user can interact by inputting a continuous gesture that indicates a word to be input to the computing device (e.g., by sliding his or her finger over various regions of the presence-sensitive screen associated with desired keys of the keyboard). In this way, continuous-gesture graphical keyboards allow a user to enter a word or group of words with a single gesture. As such, a continuous-gesture graphical keyboard may allow the user to achieve a certain degree of input efficiency.

Users may make typographical errors when entering text into a computing device. The frequency with which users make typographical errors may be higher on small virtual keyboards, such as those commonly found in today's mobile telephones and tablet computers. To help users enter text with fewer typographical errors, a computing device may determine that an entered word is not in a lexicon for a language and may attempt to identify a word that the user meant to enter. The computing device may then automatically replace the entered word with the identified word.

However, there are many instances where a user intends to input a word that is not in the lexicon. For example, the lexicon may not include the word "Raton" but the user may intend to input the word "Raton" as part of the name of the city "Boca Raton." In this example, the computing device may automatically correct the word "Raton" with a word that is in the lexicon, such as "ration." Replacement of a correctly-entered word that is not in the lexicon with incorrect words that are in the lexicon may lead to user frustration.

Furthermore, the user may misspell an out-of-lexicon word. For example, the user may misspell the word "Raton" as the character string "Rqton." In this example, the computing device may automatically replace "Rqton" with an in-lexicon word, such as "ration." This may lead to user frustration because the user may be forced to delete the replacement in-lexicon word and re-type the desired word.

SUMMARY

In one example, this disclosure describes a method that comprises determining, by a computing device, respective scores for a first set of candidate strings. Each score for each respective candidate string from the first set of candidate strings is based at least in part on a probability of the respective character string from the first set of candidate strings being entered. The method also comprises determining, by the computing device, respective scores for a second set of candidate strings. Each score for each respective candidate string from the second set of candidate strings is based at least in part on respective probabilities of characters in the respective candidate string from the second set of candidate strings being entered. In addition, the method comprises selecting, by the computing device and based at least in part on the scores for the first and second sets of candidate strings, a candidate string from among the first and second sets of candidate strings. Furthermore, the method comprises outputting, by the computing device, the selected candidate string for display at a display device.

In another example, this disclosure describes a computing device comprising one or more processors configured to determine respective scores for a first set of candidate strings. Each respective candidate string from the first set of candidate strings is based at least in part on locations indicated by indications of user input and a probability of the respective character string occurring, given one or more words that precede the respective character string from the first set of candidate strings. The one or more processors are also configured to determine scores for a second set of candidate strings. For each respective candidate string from the second set of candidate strings, the score associated with the respective candidate string is based at least in part on the locations indicated by the indications of user input and on respective probabilities of characters in the respective candidate string being entered. In addition, the one or more processors are configured to select, based at least in part on the scores for the first and second sets of candidate strings, a candidate string from among the first and second sets of candidate strings. The one or more processors are also configured to output the selected candidate string for display at a display device.

In another example, a computer-readable storage medium comprises instructions that, when executed by one or more processors of a computing device, cause the computing device to determine respective scores for a first set of candidate strings. A lexicon includes each candidate string from the first set of candidate strings and each respective candidate string from the first set of candidate strings is based at least in part on locations indicated by indications of user input and a probability of the respective candidate string being entered, given one or more words that precede the respective character string. The instructions also cause the computing device to determine respective scores for a second set of candidate strings. The lexicon does not include each candidate string from the second set of candidate strings and each respective candidate string from the second set of candidate strings is based at least in part on one or more of the locations indicated by the indications of user input and probabilities of respective characters in the respective candidate string from the second set of candidate string being entered, given one or more characters that precede the respective characters. The respective scores for the candidate strings from the second set of candidate strings are not based on probabilities of the respective candidate strings being entered. The instructions also cause the computing device to rank, based at least in part on the scores for the first and second sets of candidate strings, the respective candidate strings from the first and second sets of candidate strings. In addition, the instructions cause the computing device to select, based at least in part on the respective scores for the first and second sets of candidate strings, a highest-ranked candidate string from among the first and second sets of candidate strings. Furthermore, the instructions cause the computing device to output the highest-ranked candidate string for display at a display device.

One or more examples are set forth in the accompanying drawings and the description below. Other features, objects, and advantages will be apparent from the description, drawings, and claims.

DETAILED DESCRIPTION

Figure 1:
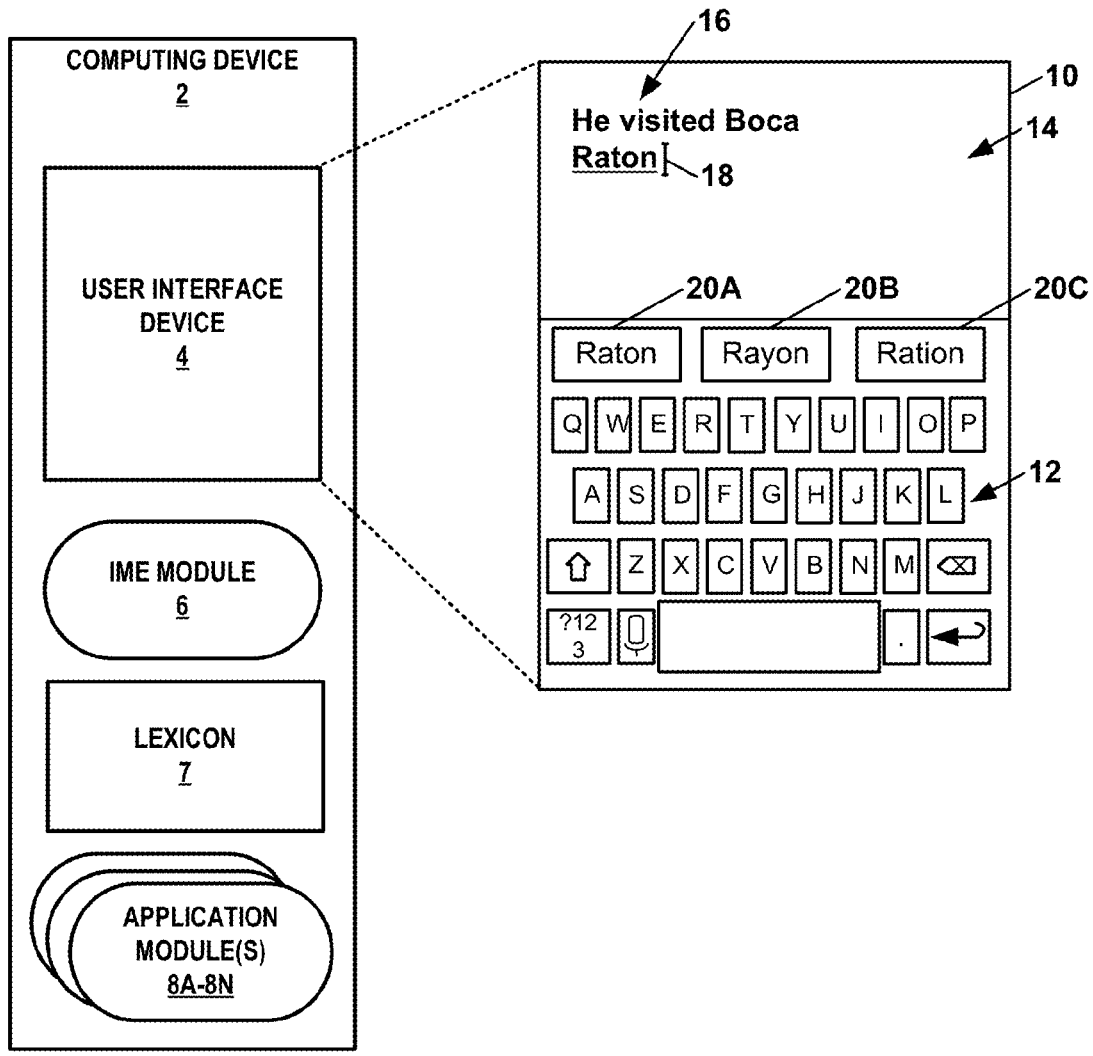
FIG. 1 is a conceptual diagram illustrating an example computing device in accordance with one or more aspects of the present disclosure.

In some implementations, a computing device may receive indications of user input (i.e. user input indications). The user input indications may correspond to points (i.e., locations) on a virtual keyboard at which a user interface device detected the presence of an input object, such as a finger or stylus. The virtual keyboard may include an array of virtual keys. In response to receiving the user input indications, the computing device may determine a character string that corresponds to the user input indications. The computing device may output the determined character string for display at a display device.

The computing device may use a lexicon that includes a plurality of character strings, such as words. The computing device may determine, based at least in part on the locations indicated by the user input indications and word-level language model (LM) scores for the character strings of the lexicon, scores for character strings in the lexicon. The word-level LM score for a character string may be based on a probability of the character string occurring (i.e., being entered) in a particular language, given up to a particular number of character strings (e.g., words) that precede the character string. The computing device may select, based on the scores of the character strings, one of the character strings and output the selected character string for display.

To correct for spelling errors or ambiguous placement of the input object, the characters of the selected character string may not necessarily match the characters that correspond to virtual keys at which the presence of the input object was detected. For example, the user input indications may correspond to the characters "Munneapolis," which is not a character string in the lexicon. In this example, the computing device may determine that the in-lexicon character string with the highest probability is "Minneapolis." Accordingly, in this example, the computing device may output, for display, the character string "Minneapolis."

If none of the in-lexicon character strings have scores that exceed (or in some examples fall below) a particular threshold, the computing device may output, for display, an out-of-lexicon character string. The out-of-lexicon character string may be a character string that is not in the lexicon. The characters of the out-of-lexicon character string may match the characters that correspond to virtual keys at which the presence of the input object was detected. For example, the user input indications may indicate that the input object was detected at virtual keys that correspond to the characters "Shinjuku," the name of a district in Tokyo, Japan. In this example, "Shinjuku" is an out-of-lexicon character string and none of the in-lexicon character strings have probabilities that exceed the particular threshold. Accordingly, the computing device may output, for display, the character string "Shinjuku."

In some instances, the user may intend to input an out-of-lexicon character string, but the score of an in-lexicon character string is greater than (or in some examples less than) the particular threshold. In such instances, the computing device may output an in-lexicon character string that is not the character string desired by the user. For example, the user input indications may indicate the presence of the input object at virtual keys that correspond to the characters "Raton," as in "Boca Raton," a city in Florida. In this example, the character string "Raton" is not in the lexicon, but the character string "ration" is in the lexicon and the score of the character string "ration" may be greater than the particular threshold. Accordingly, in this example, the computing device may output, for display, the character string "ration" instead of the desired character string "Raton." This may cause user frustration.

Furthermore, the user may misspell an out-of-lexicon character string. For example, the computing device may be configured to receive text input in the English language. In this example, the user input indications may indicate the presence of the input object at virtual keys that correspond to the characters "Ratpn," when the user intended to input the character string "Raton." As in the previous example, "Raton" is assumed to be an out-of-lexicon character string. In this example, the computing device may output the character string "Ratpn," despite the fact that the character combination "tpn" is very uncommon in the English language. The user may then be forced to edit the displayed character string.

The techniques of this disclosure may increase the efficiency of entering text on a virtual keyboard. In particular, the computing device may determine scores for a first set of candidate strings. A lexicon may include each candidate string in the first set of candidate strings. For each respective candidate string from the first set of candidate strings, the score for the respective candidate string is based at least in part on a probability of the respective character string being entered. In addition, the computing device may determine scores for a second set of candidate strings. The lexicon does not necessarily include each candidate string from the second set of candidate strings. Rather, the second set of candidate strings may include candidate strings that are not in the lexicon. For each respective candidate string from the second set of candidate strings, the score for the respective candidate string is based at least in part on respective probabilities of characters in the respective candidate string being entered.

Furthermore, the computing device may select, based at least in part on the scores for the first and second sets of candidate strings, a candidate string from among the first and second sets of candidate strings. The computing device may output the selected candidate string for display at a display device. Because the computing device selects the candidate string from among the first and second sets of candidate strings, the computing device may be able to output a desired out-of-lexicon character string. Furthermore, the computing device may be able to correct for typographical errors in the out-of-lexicon character strings.

FIG. 1 is a conceptual diagram illustrating an example computing device 2 in accordance with one or more techniques of this disclosure. Computing device 2 may be various types of computing devices. For example, computing device 2 may be a mobile device, such as a mobile telephone, a tablet computer, a notebook or laptop computer, a personal media player, a portable gaming device, or another type of computing device designed for mobility. In other examples, computing device 2 may be other types of computing devices, such as desktop computers, point of sale devices, televisions, gambling devices, appliances, in-car computers, and other types of computing devices. Furthermore, in some examples, the term "computing device" may refer to a set of one or more integrated circuits, such as microprocessors, chipsets, and so on.

In the example of FIG. 1, computing device 2 includes at least one user interface (UI) device 4. UI device 4 may display graphical data and may detect the presence of one or more input objects, such as fingers or styli. Because UI device 4 may display graphical data and may detect the presence of one or more input objects, UI device 4 may be referred to as a presence-sensitive display device. UI device 4 may be implemented using various technologies. For example, UI device 4 may be implemented using a resistive touchscreen, a surface acoustic wave touchscreen, a capacitive touchscreen, a projective capacitance touchscreen, an acoustic pulse recognition touchscreen, or another touchscreen technology. In some examples, UI device 4 may be able to detect the presence of an input object without the input object physically touching UI device 4. Rather, in such examples, UI device 4 may be able to detect the presence of the input object when the input object is within a particular space.

UI device 4 may be operatively coupled to computing device 2 in various ways. For example, UI device 4 may be integrated into a housing of computing device 2 and may be connected to computing device 2 via one or more internal connectors. In another example, UI device 4 may be external to a housing of computing device 2 and may communicate with computing device 2 via one or more external cables and/or communication networks.

Although the example of FIG. 1 assumes that UI device 4 is a presence-sensitive display device, the techniques of this disclosure are not so limited. In other examples, UI device 4 may be a display device that does not detect the presence of input objects. In some such examples, another device (e.g., one or more cameras, motion sensors, and/or other types of sensors) may detect the presence of input objects. Furthermore, the techniques of this disclosure may be applicable to text input using physical (i.e., non-virtual) keyboards.

As shown in FIG. 1, computing device 2 outputs a graphical user interface (GUI) 10 for display at UI device 4. In general, a GUI may be a type of user interface that allows a user to use images to interact with a computing device. GUI 10 may include a virtual keyboard 12. Virtual keyboard 12 may include a set of virtual keys. At least some of the virtual keys are associated with one or more characters.

In addition, GUI 10 may include a text display area 14. Computing device 2 may output text 16 for display in text display area 14 in response to indications of user input at virtual keyboard 12. In addition, text display area 14 may include a cursor 18 that indicates an insertion point within text 16. Computing device 2 may insert characters at the insertion point or delete characters adjacent to the input point indicated by cursor 18. In addition, GUI 10 may include a set of suggestion elements 20A-20C (collectively, "suggestion elements 20").

Computing device 2 may include an input method editor (IME) module 6. IME module 6 may receive indications of user input (i.e., user input indications). The user input indications may comprise data that indicate user input received by computing device 2 or another device. IME module 6 may receive various types of user input indications. For example, IME module 6 may receive user input indications that indicate presses and releases of keys on a physical keyboard. In another example, IME module 6 may receive user input indications that indicate tapping gestures at virtual keys on a virtual (e.g., onscreen) keyboard, such as virtual keyboard 12. For instance, the indications of user input may include indications of tapping gestures at portions of a display device (e.g., UI device 4) that display virtual keys associated with characters. In another example, IME module 6 may receive user input indications that indicate sliding gestures on a portion of a display device (e.g., UI device 4) that displays a virtual keyboard, such as virtual keyboard 12.

IME module 6 may determine that the user input indications correspond to strings of one or more characters (i.e., character strings). In various examples, IME module 6 may determine that the user input indications correspond to character strings that match words in various languages, such as English, Russian, French, Japanese, Korean, Chinese, Hindi, Arabic, and so on.

In the example of FIG. 1, computing device 2 also includes application module(s) 8A-8N (collectively, "application module(s) 8"). Execution of instructions in application module(s) 8 may cause computing device 2 to provide various applications (e.g., "apps"). In some examples, IME module 6 may output the character strings determined by IME module 6 to one or more of application module(s) 8.

Furthermore, when IME module 6 receives one or more user input indications, IME module 6 may determine word-level scores for a set of in-lexicon candidate strings. For each respective in-lexicon candidate string, IME module 6 may determine the word-level score for the respective in-lexicon candidate string based at least in part on locations indicated by the one or more user input indications and based at least in part on a probability of the respective in-lexicon candidate string occurring (e.g., being received as user input). In other words, the probability of a character being entered may be based at least in part on a word-level language model. Each of the in-lexicon candidate strings may be a character string in lexicon 7. Lexicon 7 may include character strings, such as words, in a particular language, such as English, French, German, Mandarin, Japanese, etc.

In accordance with the techniques of this disclosure, IME module 6 may also determine, based at least in part on the one or more user input indications, character-level scores for a set of out-of-lexicon candidate strings. The out-of-lexicon candidate strings are not necessarily in lexicon 7. In other words, lexicon 7 does not necessarily include each of the out-of-lexicon candidate strings. For instance, one or more of the out-of-lexicon candidate strings may be in lexicon 7 and one or more of the out-of-lexicon candidate strings may not be in lexicon 7.

For each respective candidate string from the set of out-of-lexicon character strings, the character-level score for the respective candidate string is based at least in part on respective probabilities of characters in the respective candidate string being entered. In some instances, the probability of the character being entered is based at least in part on one or more characters that precede the character. In other words, the probability of a character being entered may be based at least in part on a character-level language model. Thus, a character-level score of an out-of-lexicon candidate string may be correlated with the probability of the combination of characters within the out-of-lexicon candidate string occurring in the language of lexicon 7. For example, in the English language, the combination of characters in the character string "Raton" is more likely to occur than the combination of characters in the character string "Ratpn." Hence, in this example, IME module 6 may assign a higher character-level score to the out-of-lexicon character string "Raton" than to the out-of-lexicon character string "Ratpn," even though the user input indications may indicate locations on virtual keyboard 12 closed to the characters "Ratpn." In this example, at least one of the indications of the user input may indicate a location (i.e., the virtual key associated with the character "p") that does not correspond to a virtual key associated with a character in the selected character string (i.e., the character "o").

As indicated above, the score for a character may be based at least in part on a probability of the character occurring, given up to n characters that precede the character in a character string, where n is a non-negative integer. For example, the score of the character "s" may be relatively low if the character "s" is immediately preceded by a word delimiter (e.g., space) and the character "g." In other words, in this example, it's unlikely that a character string starts with the characters "gs." However, in this example, the score of the character "a" may be relatively high compared to the character "s" if the preceding characters are a word delimiter and the character "g." That is because many words in the English language start with the characters "ga."

After IME module 6 determines the scores for the set of in-lexicon candidate strings and the set of out-of-lexicon candidate strings, IME module 6 may select one or more of the candidate strings from the set of in-lexicon candidate strings and the set of out-of-lexicon candidate strings. In some examples, IME module 6 may select the portion of the candidate strings based at least in part on the language-level scores for the in-lexicon candidate strings and the character-level scores for the out-of-lexicon candidate strings. For instance, IME module 6 may rank the in-lexicon and out-of-lexicon candidate strings based at least in part on the scores for the in-lexicon and out-of-lexicon candidate strings. In some examples, IME module 6 may select the portion of the candidate strings based on one or more additional factors, such as whether certain candidate strings are blacklisted or whitelisted. After selecting the portion of the candidate strings, IME module 6 may populate the selected candidate strings into suggestion elements 20. As illustrated in FIG. 1, IME module 6 may populate the candidate strings "Raton," "Rayon" and "Ration" into suggestion elements 20.

IME module 6 may receive a user input indication that corresponds to a user selection of one of suggestion elements 20. In response, IME module 6 may determine a relevant character string for a candidate string in the selected suggestion element. The relevant character string may be a string of characters in text 16. IME module 6 may then replace the relevant character string with the candidate string in the selected suggestion element. For example, if IME module 6 receives a user input indication that corresponds to a user selection of suggestion element 20C in configuration 10A of GUI 10, computing device 2 may replace the character string "Raton" with the candidate string "Ration." In some examples, the relevant character string may include the characters of a word adjacent to cursor 18. Furthermore, in some instances, the relevant character string may include one or more words that precede cursor 18.

In this way, IME module 6 may select, based at least in part on the scores for the in-lexicon and out-of-lexicon sets of candidate strings, a plurality of candidate strings from among the in-lexicon and out-of-lexicon sets of candidate strings. Furthermore, IME module 6 may output, for display at UI device 4, the plurality of candidate strings (e.g., in suggestion elements 20). IME module 6 may determine that an indication of user input corresponds to a selection of a particular candidate string from the plurality of candidate strings. IME module 6 may output, for display at UI device 4, the particular candidate string in an active text area of a GUI 10.

In many instances, computing device 2 does not receive a user input indication that corresponds to a user selection of one of suggestion elements 20. Rather, after determining that a series of user input indications corresponds to a particular character string, IME module 6 may determine that a subsequent user input indication corresponds to a word delimiter. Example word delimiters may include space characters, period marks, question marks, commas, semi-colons, quotation marks, exclamation marks, return characters, the beginning of the text, and so on. In addition, IME module 6 may determine that a subsequent user input indication corresponds to a word delimiter if the subsequent user input indication indicates a gesture (e.g., a tapping or sliding gesture) to move cursor 18 to a different location within text display area 14.

In response to determining that the subsequent user input indication corresponds to a word delimiter, IME module 6 may determine a top-ranked candidate string. In addition, IME module 6 may determine the relevant character string for the top-ranked candidate string. IME module 6 may determine, based at least in part on a comparison of the score (i.e., the word-level score or character-level score) of the top-ranked candidate string and an auto-replacement threshold, whether to automatically replace the relevant character string with the top-ranked candidate string. For example, if the score for the top-ranked candidate string is above an auto-replacement threshold, IME module 6 may automatically replace the relevant character string for the top-ranked candidate string with the top-ranked candidate string. In this way, IME module 6 may automatically replace the relevant character string with the top-ranked candidate string when the user inputs a word delimiter, such as a space character. That is, IME module 6 may output, for display at the UI device 4, the selected candidate string in place of another already-displayed character string.

In this way, computing device 2 may determine scores for a first set of candidate strings. A lexicon includes each candidate string from the first set of candidate strings. For each respective candidate string from the first set of candidate strings, the score for the respective candidate string may be based at least in part on a probability of the respective character string being entered. Furthermore, computing device 2 may determine scores for a second set of candidate strings. The lexicon does not necessarily include each candidate string from the second set of candidate strings. For each respective candidate string from the second set of candidate strings, the score for the respective candidate string is based at least in part on respective probabilities of characters in the respective candidate string being entered. Computing device 2 may select, based at least in part on the scores for the first and second sets of candidate strings, a candidate string from among the first and second sets of candidate strings. Furthermore, computing device 2 may output the selected candidate string for display at a display device, such as UI device 4.

Computing device 2 may determine scores for candidate strings, select candidate strings, and output candidate strings incrementally in response to indications of user input. For example, computing device 2 may update the scores for the candidate strings incrementally with each subsequent key tap, building upon the top-ranked candidate strings from the previous iteration. For instance, in response to an indication of an additional indication of user input, computing device 2 may re-determine the scores for the first set of candidate strings. Moreover, computing device 2 may re-determine the scores for the second set of candidate strings. Computing device 2 may re-select, based at least in part on the scores for the first and second sets of candidate strings, a candidate string from among the first and second sets of candidate strings. Furthermore, computing device 2 may output the re-selected candidate string for display at the display device.

Figure 2:
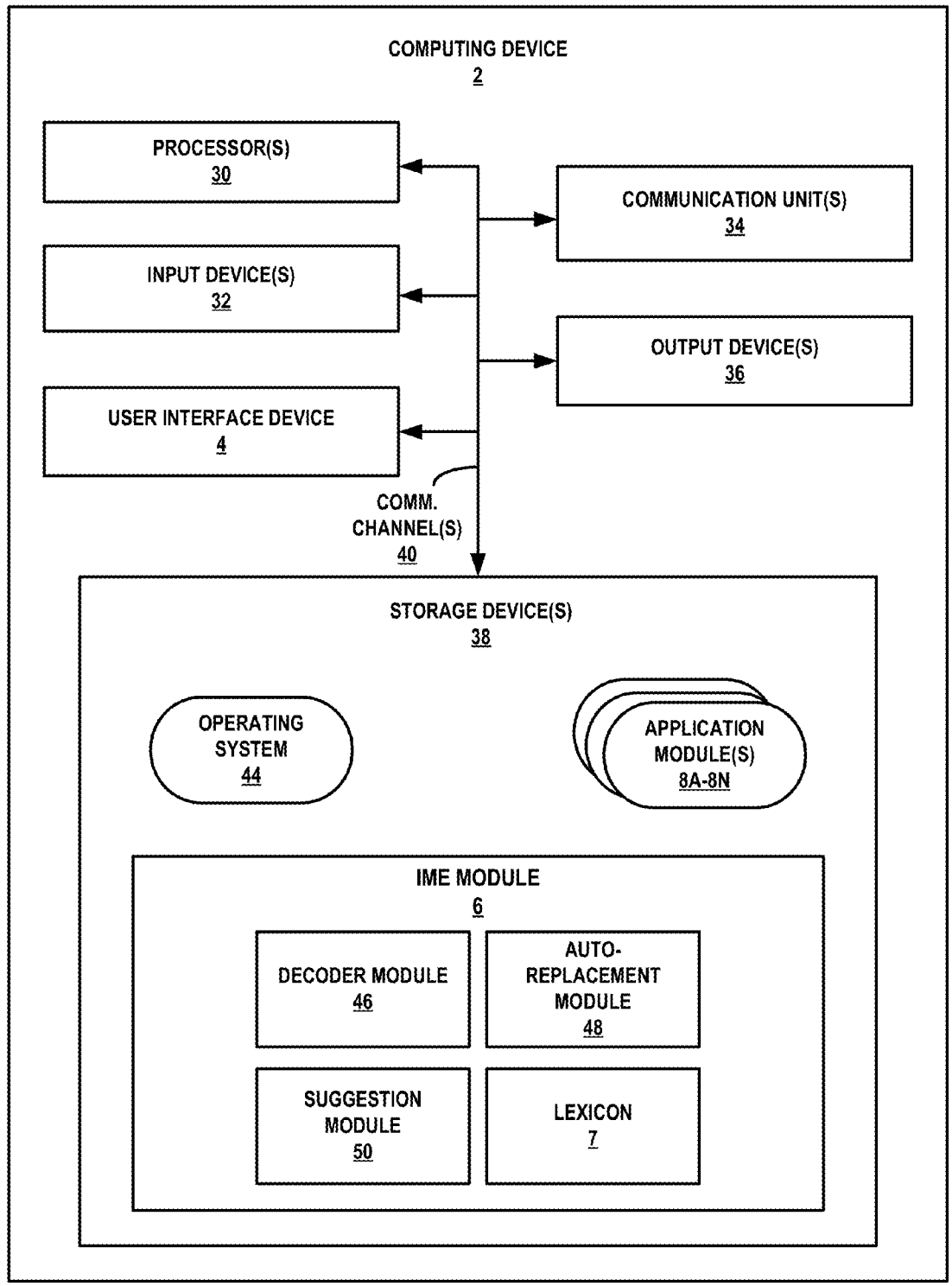
FIG. 2 is a block diagram illustrating an example computing device, in accordance with one or more aspects of the present disclosure.

FIG. 2 is a block diagram illustrating an example configuration of computing device 2, in accordance with one or more aspects of this disclosure. For purposes of illustration, the discussion of FIG. 2 and the following figures includes continued references to FIG. 1. However, the techniques of this disclosure are not so limited. FIG. 2 illustrates only one particular example of computing device 2, and many other example configurations of computing device 2 exist.

As shown in the example of FIG. 2, computing device 2 includes one or more processors 30, one or more input devices 32, one or more communication units 34, one or more output devices 36, one or more storage devices 38, one or more communication channels 40, and UI device 4. Computing device 2 may include many other components. For example, computing device 2 may include physical buttons, microphones, speakers, communication ports, and so on.

Communication channels 40 may interconnect each of the components 30, 32, 34, 36, 38, and 4 for inter-component communications (physically, communicatively, and/or operatively). In some examples, communication channel(s) 40 may include a system bus, a network connection, an inter-process communication data structure, or any other method for communicating data.

One or more storage device(s) 38 within computing device 2 may store information required for use during operation of computing device 2. Storage device(s) 38, in some examples, have the primary purpose of being a short term and not a long-term computer-readable storage medium. Storage device(s) 38 may be volatile memory and may therefore not retain stored contents if powered off. Examples of volatile memories may include random access memories (RAM), dynamic random access memories (DRAM), static random access memories (SRAM), and other forms of volatile memories known in the art. Storage devices 38 may further be configured for long-term storage of information as non-volatile memory space and retain information after power on/off cycles. Examples of non-volatile memory configurations may include magnetic hard discs, optical discs, floppy discs, flash memories, or forms of electrically programmable memories (EPROM) or electrically erasable and programmable (EEPROM) memories. In some examples, processor(s) 30 on computing device 2 read and may execute instructions stored by storage device(s) 38.

Computing device 2 may include one or more input device(s) 32 that computing device 2 uses to receive user input. Examples of user input include tactile, audio, and video user input. Input device(s) 32 may include presence-sensitive screens, touch-sensitive screens, mice, keyboards, voice responsive systems, video cameras, microphones or other types of devices for detecting input from a human or machine.

Communication unit(s) 34 may enable computing device 2 to send data on and receive data from a communications network, such as a local area network or the Internet. In some examples, communication unit(s) 34 may include wireless transmitters and receivers that enable computing device 2 to communicate wirelessly with the communications network. Examples of communication unit(s) 34 may include network interface cards, Ethernet cards, optical transceivers, radio frequency transceivers, or other types of devices that are able to send and receive information. Other examples of such communication units may include Bluetooth, 3G, and WiFi radios, Universal Serial Bus (USB) interfaces, etc.

Output device(s) 36 may generate output. Examples of output include tactile, audio, and video output. Output device(s) 36 may include presence-sensitive screens, sound cards, video graphics adapter cards, speakers, cathode ray tube (CRT) monitors, liquid crystal displays (LCD), or other types of devices for generating output.

Processor(s) 30 may read instructions from storage device(s) 38 and may execute instructions stored by storage device(s) 38. Execution of the instructions by processors 30 may configure or cause computing device 2 to provide at least some of the functionality ascribed in this disclosure to computing device 2. As shown in the example of FIG. 2, storage device(s) 38 include computer-readable instructions associated with operating system 44, IME module 6, and application modules 8A-8N. Execution of instructions associated with operating system 44 may cause computing device 2 to perform various functions to manage hardware resources of computing device 2 and to provide various common services for other computer programs. Execution of instructions associated with application modules 8 may cause computing device 2 to provide various applications (e.g., "apps").

In the example of FIG. 2, IME module 6 includes a decoder module 46, an auto-replacement module 48, a suggestion module 50, and lexicon 7. Execution of instructions in these modules may cause computing device 2 to provide the functionality ascribed in this disclosure to these modules.

Decoder module 46 may receive user input indications from operating system 44. The user input indications may be indications of user inputs received by UI device 4, input device(s) 32, and/or other devices. The user input indications may include touch-down indications, lift-off indications, movement indications, and/or indications of other types of user inputs. A touch-down indication may indicate that UI device 4 has detected the presence of an input object at a particular location. A lift-off indication may indicate that UI device 4 is no longer able to detect the presence of an input object or may indicate that an input object has moved away from an applicable surface or plane. A movement indication may indicate a movement of an input object on an applicable surface or plane, such as UI device 4.

Decoder module 46 may determine that a tapping gesture has occurred if a touch-down indication occurs for an input object, followed by a lift-off indication for the input object without a significant intervening movement indication for the input object. Decoder module 46 may determine that a sliding gesture has occurred if a touch-down indication occurs for an input object, followed by a movement indication for the input object, followed by a lift-off indication for the input object. Furthermore, if one of input device(s) 32 is a physical keyboard, the user input indications may include key up and key down indications that correspond to the pressing and releasing of various keys of the physical keyboard.

Decoder module 46 may determine, based at least in part on a series of one or more user input indications, a set of one or more character strings. Decoder module 46 may perform various operations to determine the set of one or more character strings. In accordance with the techniques of this disclosure, decoder module 46 may determine the set of one or more character strings by determining scores for character strings in a set of in-lexicon candidate strings and scores for character strings in a set of out-of-lexicon candidate strings.

The score for an in-lexicon candidate string may be based at least in part on one or more of the locations indicated by the user input indications. In addition, the score for an in-lexicon candidate string may be based at least in part on the probability of the in-lexicon candidate string occurring in a particular language, given up to n words that precede the in-lexicon candidate string. The value n may be a non-negative integer, such as 0, 1, 2, 3, etc. Thus, the score for an in-lexicon candidate string may be affected by the word-level context of the in-lexicon candidate string.

The score for an out-of-lexicon candidate string may be based at least in part on one or more of the locations indicated by the user input indications. In addition, the score for an out-of-lexicon candidate string may be based at least in part on probability scores for characters in the out-of-lexicon candidate string. The probability score for a character may be based on the probability of the character occurring in a particular language, given up to n characters that precede the character, where n is a non-negative integer. In typical examples, the score for the out-of-lexicon candidate string is not affected by the word-level context of the out-of-lexicon candidate string. In other words, the scores for the set of out-of-lexicon candidate strings are not based on word-level probabilities.

Decoder module 46 may determine the in-lexicon candidate strings, the out-of-lexicon candidate strings, and their scores in various ways. For example, decoder module 46 may use a lexicon finite state transducer (FST) to determine the in-lexicon candidate strings and their scores. Decoder module 46 may use a different, character-level FST to determine the out-of-lexicon candidate strings and their scores. FIGS. 7, 8A, 8B, 9 and 10, described in detail below, illustrate example operations that may determine the candidate strings and their scores using FSTs.

After decoder module 46 determines the set of one or more candidate strings and their replacement scores, auto-replacement module 48 may determine, in response to decoder module 46 determining that a user input indication corresponds to a word delimiter, a top-ranked candidate string. In other words, auto-replacement module 48 may select the top-ranked candidate string. In some examples, the top-ranked candidate string may be the candidate string with a lowest replacement score. In other examples, the top-ranked candidate string may be the candidate string with a highest replacement score.

In addition, auto-replacement module 48 may replace, based at least in part on a comparison of a replacement score of a candidate string and an auto-replacement threshold, the relevant string with the top-ranked candidate string. In some examples, auto-replacement module 48 may determine whether the replacement score for the top-ranked candidate string is lower than an auto-replacement threshold. In response to determining that the replacement score for the top-ranked candidate string is less than the auto-replacement threshold, auto-replacement module 48 may output, for display at UI device 4, the top-ranked candidate string in place of the relevant character string for the top-ranked candidate string.

Furthermore, suggestion module 50 may select, based at least in part on the scores of the candidate strings, at least a portion of the candidate strings. Suggestion module 50 may then output the selected candidate strings in suggestion elements 20. In other words, suggestion module 50 may populate the selected candidate strings into suggestion elements 20. In some examples, decoder module 46 may determine a set of candidate strings for auto-replacement and a separate set of candidate strings for use in populating suggestion elements 20. Furthermore, in some examples, decoder module 46 may determine a set of scores for auto-replacement and a separate set of scores for use in populating suggestion elements 20.

Suggestion module 50 may determine, based at least in part on one or more user input indications, that a user has selected one of suggestion elements 20. In response, suggestion module 50 may replace, at UI device 4, a portion of the displayed text with the candidate string associated with the selected suggestion element. For instance, suggestion module 50 may replace one or more words with the selected suggestion element's candidate string.

Figure 3:
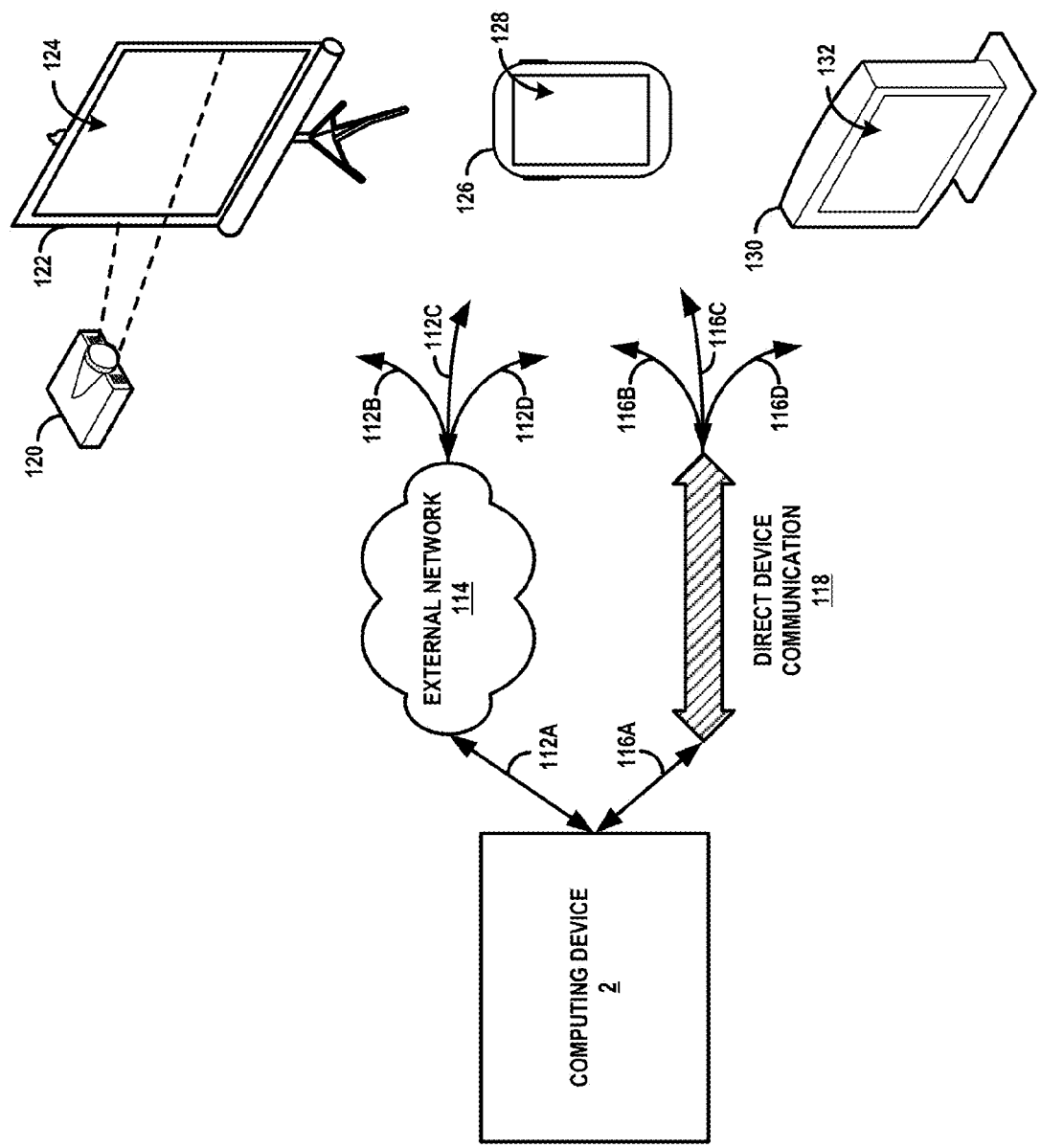
FIG. 3 is a block diagram illustrating an example in which a computing device outputs graphical content for display at a remote display device, in accordance with one or more aspects of the present disclosure.

FIG. 3 is a block diagram illustrating an example in which computing device 2 outputs graphical content for display at a remote display device, in accordance with one or more techniques of the present disclosure. Graphical content, generally, may include any visual information that may be output for display, such as text, images, a group of moving images, etc. The example of FIG. 3 includes computing device 2. Although shown for purposes of example in FIGS. 1 and 2 as a stand-alone computing device, computing device 2 may be a component or system that includes a processor or other suitable computing environment for executing software instructions and, for example, need not include a presence-sensitive display. Computing device 2 may include one or more processors (e.g., one or more microprocessor or other types of integrated circuits), a smartphone, a tablet computer, a personal computer, or another type of computing device that is configured to perform one or more techniques of this disclosure.

FIG. 3 also illustrates a projector 120 and a projection screen 122. Other such examples of projection devices may include electronic whiteboards, holographic display devices, and any other suitable devices for displaying graphical content. Projector 120 and projection screen 122 may include one or more communication units that enable the respective devices to communicate with computing device 2. In some examples, projector 120 and projection screen 122 may be configured to communicate with each other. Projector 120 may receive data from computing device 2 that includes graphical content. Projector 120 may, in response to receiving the data, project the graphical content onto projection screen 122. In some examples, projector 120 may determine one or more user inputs (e.g., continuous gestures, multi-touch gestures, single-touch gestures, etc.) at projector screen using optical recognition or other suitable techniques and send indications of such user input using one or more communication units to computing device 2.

In some examples, projection screen 122 may include a presence-sensitive display 124. Presence-sensitive display 124 may include a subset of functionality or all of the functionality of UI device 4 as described in this disclosure. In some examples, presence-sensitive display 124 may include additional functionality. Projection screen 122 (e.g., an electronic whiteboard), may receive data from computing device 2 and display the graphical content. In some examples, presence-sensitive display 124 may determine one or more user inputs (e.g., continuous gestures, multi-touch gestures, single-touch gestures, etc.) at projection screen 122 using capacitive, inductive, and/or optical recognition techniques and send indications of such user input using one or more communication units to computing device 2.

The example of FIG. 3 also illustrates a mobile device 126 and a display device 130. Mobile device 126 and display device 130 may each include computing and connectivity capabilities. Examples of mobile device 126 may include e-reader devices, convertible notebook devices, hybrid slate devices, mobile telephones, personal media players, remote controller devices, wearable computing devices, etc. Examples of display device 130 may include televisions, computer monitors, etc. As shown in the example of FIG. 3, mobile device 126 may include a presence-sensitive display 128. Display device 130 may include a presence-sensitive display 132. Presence-sensitive displays 128, 132 may include a subset of functionality or all of the functionality of UI device 4 as described in this disclosure. In some examples, presence-sensitive displays 128, 132 may include additional functionality. In any case, presence-sensitive display 132, for example, may receive data from computing device 2 and display the graphical content. In some examples, presence-sensitive display 132 may determine one or more user inputs (e.g., continuous gestures, multi-touch gestures, single-touch gestures, etc.) at presence-sensitive display 132 using capacitive, inductive, and/or optical recognition techniques and send indications of such user input using one or more communication units to computing device 2.

In some examples, computing device 2 may output graphical content for display at one or more remote devices, such as projector 120, projection screen 122, mobile device 126, and display device 130. For instance, computing device 2 may execute one or more instructions to generate and/or modify graphical content in accordance with techniques of the present disclosure. Computing device 2 may output the data that includes the graphical content to a communication unit of computing device 2. Computing device 2 may send the data to one or more of the remote devices, such as projector 120, projection screen 122, mobile device 126, and/or display device 130. In this way, computing device 2 may output the graphical content for display at one or more of the remote devices. In some examples, one or more of the remote devices may output the graphical content at a presence-sensitive display that is included in and/or operatively coupled to the respective remote devices.

Computing device 2 may send and receive data using various communication techniques. For example, computing device 2 may be operatively coupled to external network 114 using network link 112A. Each of the remote devices illustrated in the example of FIG. 3 may be operatively coupled to network external network 114 by one of respective network links 112B, 112C, and 112D. External network 114 may include network hubs, network switches, network routers, etc., that are operatively inter-coupled, thereby providing for the exchange of information between computing device 2 and the remote devices illustrated in the example of FIG. 3. In some examples, network links 112A-112D may be Ethernet, asynchronous transfer mode (ATM) or other network connections. Such connections may be wireless and/or wired connections.

In some examples, computing device 2 may be operatively coupled to one or more of the remote devices included in the example of FIG. 3 using direct device communication 118. Direct device communication 118 may include communications through which computing device 2 sends and receives data directly with a remote device, using wired or wireless communication. That is, in some examples of direct device communication 118, data sent by computing device 2 may not be forwarded by one or more additional devices before being received at the remote device, and vice-versa. Examples of direct device communication 118 may include Bluetooth, Near-Field Communication, Universal Serial Bus, WiFi, infrared, etc. One or more of the remote devices illustrated in the example of FIG. 3 may be operatively coupled with computing device 2 by communication links 116A-116D. In some examples, communication links 112A-112D may be connections using Bluetooth, Near-Field Communication, Universal Serial Bus, infrared, etc. Such connections may be wireless and/or wired connections.

Computing device 2 may receive indications of user input from presence-sensitive displays 124, 128, 132. Furthermore, computing device 2 may determine scores for a first set of candidate strings. For each respective candidate string from the first set of candidate strings, the score for the respective candidate string is based at least in part on a probability of the respective character string as a whole occurring. In addition, computing device 2 may determine respective scores for a second set of candidate strings. For each respective candidate string from the second set of candidate strings, the score for the respective candidate string is based at least in part on respective probabilities of characters in the respective candidate string occurring and the score for the respective candidate string is not based on a probability of the respective character string as a whole occurring. Computing device 2 may select, based at least in part on the scores for the first and second sets of candidate strings, a candidate string from among the first and second sets of candidate strings and may output the selected candidate string for display at projector 120, presence-sensitive display 128, and/or presence-sensitive display 132.

Figure 4:
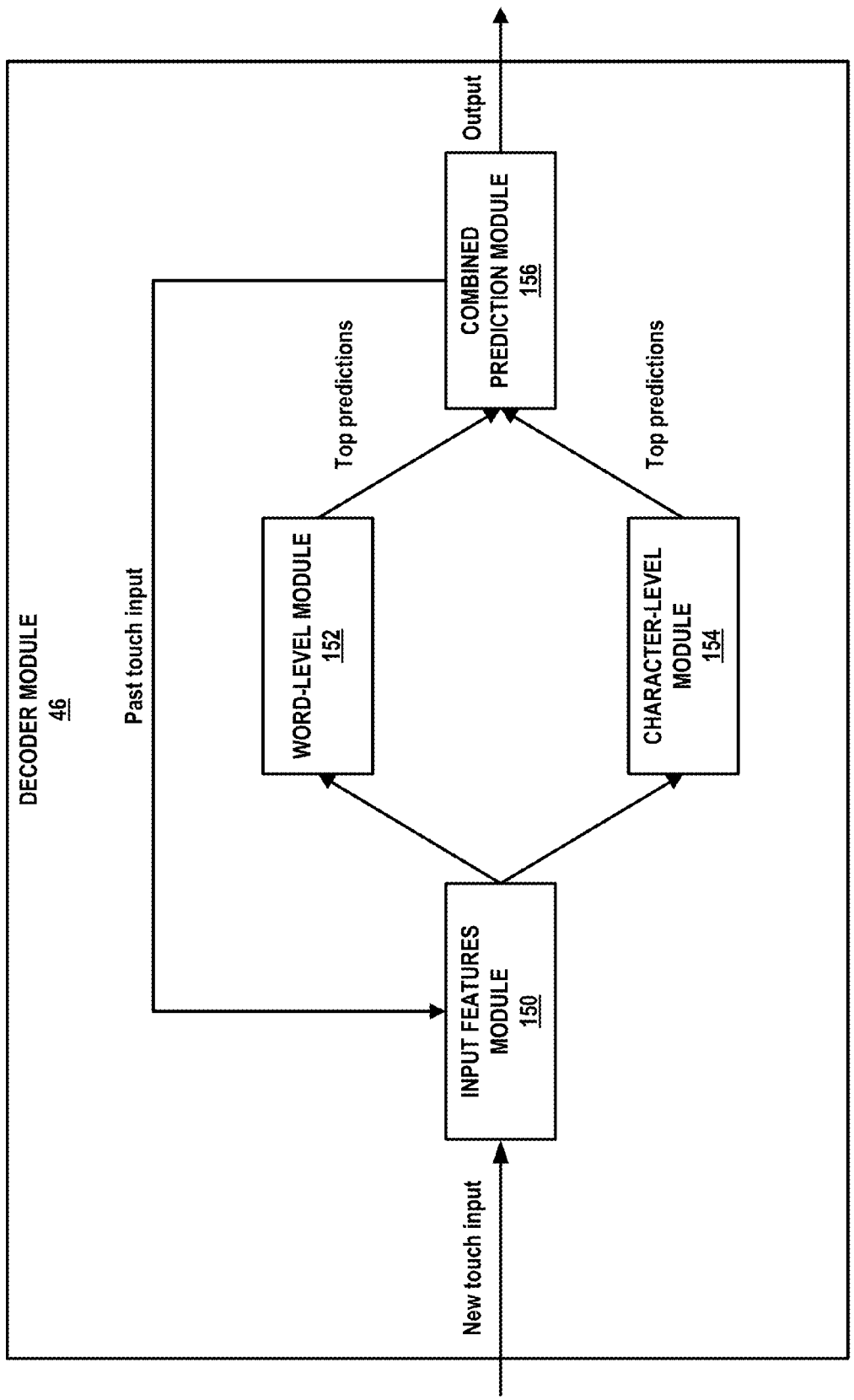
FIG. 4 is a block diagram illustrating an example decoder module, in accordance with one or more aspects of the present disclosure.

FIG. 4 is a block diagram that illustrates an example architecture of decoder module 46 for combining character and word level language models, in accordance with the techniques of this disclosure. As illustrated in the example of FIG. 4, decoder module 46 includes an input features module 150, a word-level module 152, a character-level module 154, and a combined prediction module 156.

Input features module 150 may receive new user input indications and past user input indications. In some examples, the user input indications are indications of touch input. The new and past user input indications may include various data regarding user input, such as the position an input object, a movement of an input object, a speed of an input object, and so on. Input features module 150 may provide the user input indications to word-level module 152 and may also provide the series of user input indications to character-level module 154.

Word-level module 152 may determine scores for a first set of candidate strings (i.e., predictions). Lexicon 7 includes each word from the first set of candidate strings. Hence, the first set of candidate strings may be referred to herein as in-lexicon candidate strings. Word-level module 152 may determine the scores such that for each respective in-lexicon candidate string, the score for the respective in-lexicon candidate string is based at least in part on a probability of the in-lexicon character string occurring, given up to n words that precede the in-lexicon character string in text 16, where n is a non-negative integer.

In the example of FIG. 4, word-level module 152 may output at least a portion of the first set of in-lexicon candidate strings and the scores for the set of in-lexicon candidate strings to combined prediction module 156. In some examples, word-level module 152 may rank the in-lexicon candidate strings based, at least in part, on the scores for the in-lexicon candidate strings. In such examples, word-level module 152 may output to combined prediction module 156 only a particular number of the highest-ranked in-lexicon candidate strings.

Character-level module 154 may determine scores for a second set of candidates strings. The second set of candidate strings may include candidate strings that are in lexicon 7 and candidate strings that are not in lexicon 7. Hence, the second set of candidate strings may be referred to herein as out-of-lexicon candidate strings. In some instances, one or more character strings may be in both the first and second sets of candidate strings.

In the example of FIG. 4, character-level module 154 may output at least a portion of the out-of-lexicon candidate strings and the scores for the out-of-lexicon candidate string to combined prediction module 156. In some examples, character-level module 154 may rank the out-of-lexicon candidate strings based, at least in part, on the scores for the out-of-lexicon candidate strings. In such examples, character-level module 154 may output to combined prediction module 156 only a particular number of the highest-ranked out-of-lexicon candidate strings.

Character-level module 154 may determine the scores for the second set of character strings without the use of lexicon 7. Rather, for each respective candidate string from the second set of candidate strings, the score for the respective candidate string is based at least in part, and in some instances exclusively, on scores for characters in the respective candidate string. For each respective character in the respective candidate string, the score for the respective character is based at least in part, and in some instances exclusively, on the series of user input indications and a probability of the character given up to n characters that precede the respective character, where n is a non-negative integer. That is, the score for a particular character $L_i$ is conditioned on the past n characters, where n is a non-negative integer.

In one example, the score for a character of an out-of-lexicon candidate string is the probability of the character occurring in any character string of a particular language, given the n characters that precede the character. In other words, the score for a particular character $L_i$ may be equal to:

$$P(L_i)=P(L_i|L_{i-1},L_{i-2},\ldots,L_{i-n})$$

For instance, in this example, the probability of a character "k" may be low if the preceding character is "z," because the character combination "zk" is relatively uncommon in the English language. Similarly, the probability of the character "h" may be high if the preceding character is "t," because the character combination "th" is relatively common in the English language. Similarly, the out-of-lexicon candidate string "Raton" may have a higher probability than the out-of-lexicon candidate string "Rsypn" because the constituent bi-gram (i.e., n=1) character combinations of "Raton" (i.e., "Ra," "at", "to", and "on") are more probable than those of "Rsypn" (i.e., "Rs," "sy," "yp," and "pn").

In some examples, character-level module 154 may use a distinguished character as a character string boundary or separator. Such distinguished characters may include space characters, punctuation marks, the start of a text, a carriage return, and so on. For example, the tri-gram (i.e., n=2) character combination that includes a distinguished character followed by the characters "rt" may have a relatively low score because few words in the English language begin with "rt." However, in this example, the tri-gram character combination "art" may have a relatively high score because many words in the English language include the character combination "art" (e.g., "start," "mart," "cart," etc.).

Combined prediction module 156 may select, based at least in part on the scores for the in-lexicon candidate strings and the scores for the out-of-lexicon candidate strings, one or more candidates from among the in-lexicon candidate strings and out-of-lexicon candidate strings. The selected set of candidate strings may be referred to herein as a combined set of candidate strings. Combined prediction module 156 may output the selected candidate strings to auto-replacement module 48 and/or suggestion module 50 (FIG. 2).

Figure 5:
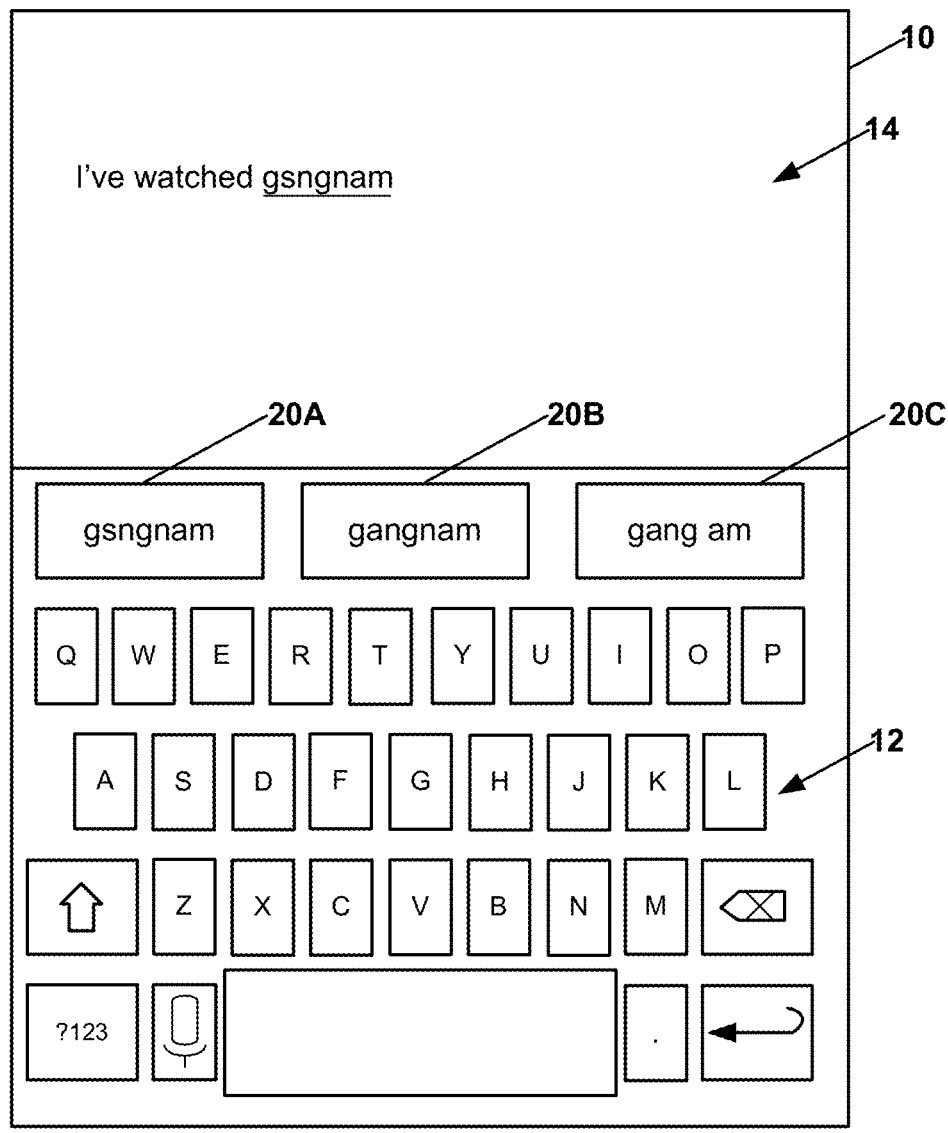
FIG. 5 is a conceptual diagram illustrating an example misspelling of an out-of-lexicon word and replacement suggestions, in accordance with one or more aspects of the present disclosure.

FIG. 5 is a conceptual diagram illustrating an example misspelling of an out-of-lexicon word and replacement suggestions, in accordance with one or more aspects of the present disclosure. As illustrated in the example of FIG. 5, GUI 10 includes the text "I've watched gsngnam." The character string "gsngnam" is not in lexicon 7. In accordance with the techniques of this disclosure, word-level module 152 may determine a set of in-lexicon candidate strings and character-level module 154 may determine a set of out-of-lexicon candidate strings. In addition, combined prediction module 156 may generate, based at least in part on scores of candidate strings in the sets of in-lexicon and out-of-lexicon candidate strings, a combined set of candidate strings. Computing device 2 may then output, for display, at least a portion of the combined set of candidate strings.

In the example of FIG. 5, the portion of the combined set of candidate strings includes the candidate strings "gsngnam," "gangnam," and "gang am." The character strings "gsngnam" and "gangnam" are not in lexicon 7, but the character string "gang am" includes character strings in lexicon 7. "Gangnam" is the name of a district in Seoul, South Korea, and the subject of a well-known music video.

The combined set of candidate strings may include the character string "gangnam" because the combination of characters in "gangnam" is more likely to occur in the English language than the combination of characters in "gsngnam." The score of the out-of-lexicon character string "gangnam" may be higher than the scores of other candidate strings, including candidate strings that are in lexicon 7. In other examples, the score of the out-of-lexicon character string "gangnam" may be lower than the scores of other in-lexicon and/or out-of-lexicon candidate strings. Accordingly, suggestion module 50 may output the character string "gangnam" in one of suggestion elements 20.

Figure 6:
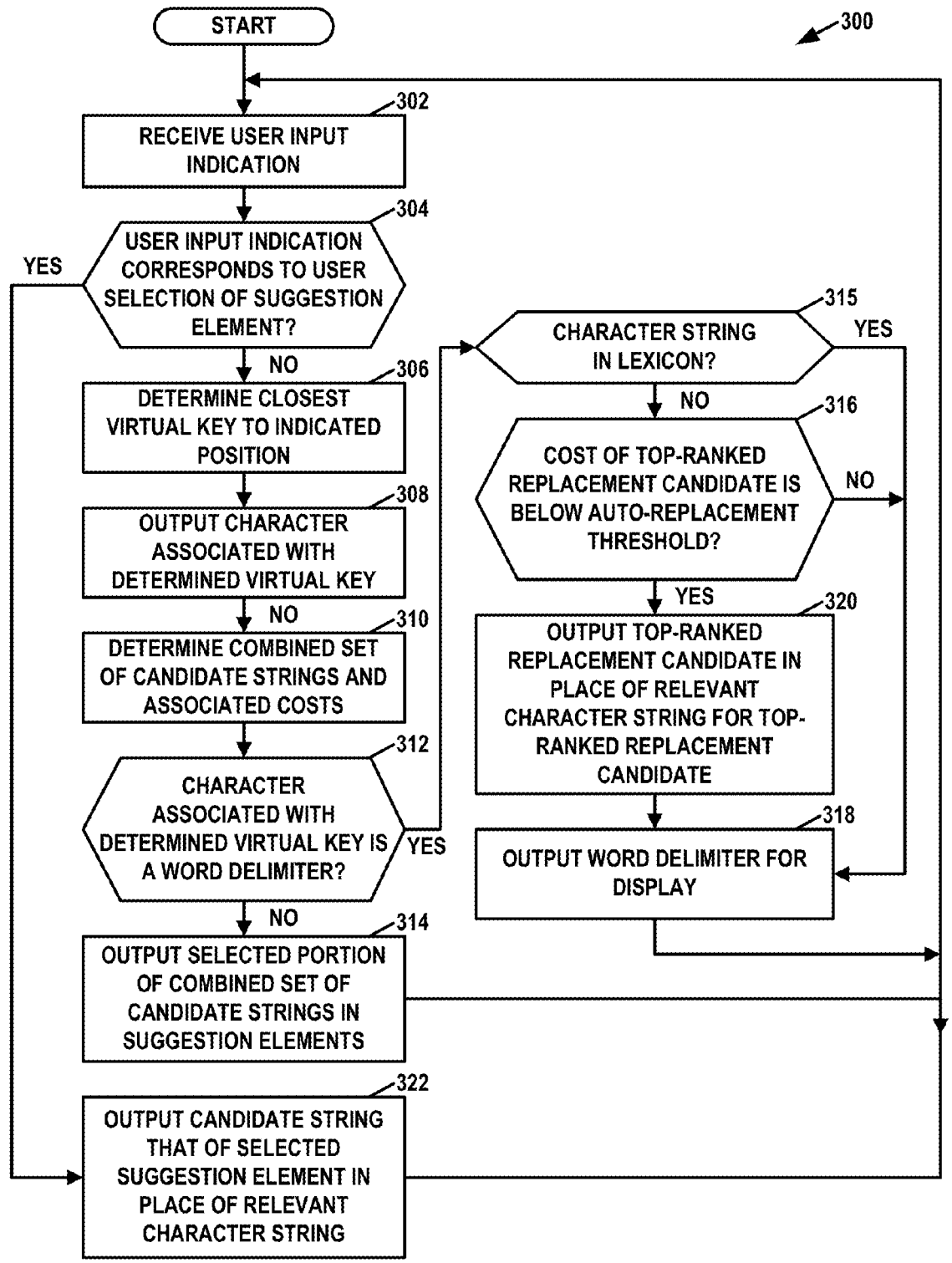
FIG. 6 is a flowchart illustrating an example operation of an input method editor (IME) module, in accordance with one or more aspects of the present disclosure.

FIG. 6 is a flowchart illustrating an example operation 300 of IME module 6, in accordance with one or more aspects of this disclosure. In the example of FIG. 6, IME module 6 may receive a user input indication (302). The user input indication may indicate a position at which an input object, such as a finger or stylus, was detected. IME module 6 may determine whether the user input indication corresponds to a user selection of a suggestion element, such as one of suggestion elements 20 (304). In response to determining that the user input indication does not correspond to a selection of a suggestion element ("NO" branch of 304), IME module 6 may determine a closest virtual key to the position indicated by the user input indication (306). IME module 6 may output, for display at UI device 4, the character associated with the determined virtual key (308). For example, if the determined virtual key corresponds to the character "a," IME module 6 may output the character "a" at an insertion point.

Furthermore, IME module 6 may determine a combined set of candidate strings and associated scores (310). In accordance with the techniques of this disclosure, the combined set of candidate strings may include candidate strings from a set of in-lexicon strings and a set of out-of-lexicon strings. In some examples, IME module 6 may perform the example operation of FIGS. 8A, 8B, 10, and 11 to determine the combined set of candidate strings and the associated scores.

As described elsewhere in this disclosure, the score associated with a candidate string may be informed by various sources. For example, the score associated with a candidate string may be based, at least in part, on a word-level language model. The word-level language model may indicate the probability of a word (e.g., character string in lexicon 7) given zero or more preceding words. In some examples, the word-level language model may also indicate a likelihood that lexicon 7 does not include the candidate string. Furthermore, the score associated with a candidate string may be based, at least in part, on a character-level language model. The character-level language model may indicate whether the candidate string includes unlikely character pairs (i.e., n-grams). In some examples, the score for the candidate string may be based, at least in part, on addition information. For example, the score for the candidate string may be based, at least in part, on whether IME module 6 received an indication of a tapping gesture at a shift key. In this example, lexicon 7 may be less likely to include character strings that are capitalized. In another example, the score for the candidate string may be based, at least in part, on whether the user input indications correspond to tapping gestures that are close to the centers of virtual keys or whether the tapping gestures are sloppy (i.e., further from the centers of the virtual keys). In this example, users may be more likely to use precise tapping gestures when typing an out-of-lexicon character string than an in-lexicon character string. In another example, the score for the candidate string may be based, at least in part, on the speed at which the user is entering text. If the user is entering text at a faster pace than typical for the user, the score for the candidate string may reflect that the user is more likely to be entering an in-lexicon character string than an out-of-lexicon character string.

IME module 6 may also determine whether the character associated with the determined virtual key is a word delimiter (312). Example word delimiters include space characters, return characters, commas, periods, question marks, parenthesis, and so on. In response to determining that the character string does not end with a word delimiter ("NO" branch of 312), IME module 6 may output a selected portion of the combined set of candidate strings in suggestion elements 20 (314). IME module 6 may select the portion of the combined set of candidate strings based on the scores of the candidate strings from the combined set of candidate strings.

In response to determining that the character associated with the determined virtual key is a word delimiter ("YES" branch of 312), IME module 6 may determine whether a character string that occurs between an immediately previous word delimiter and the insertion point is a character string in lexicon 7 (315). In response to determining that the character string is not a character string in lexicon 7 ("NO" branch of 315), IME module 6 may determine whether the score of the top-ranked candidate string is below an auto-replacement threshold (316). The top-ranked candidate string may be the candidate string from the combined set of candidate strings that has the lowest score. In response to determining that the score of the top-ranked candidate string is not below the auto-replacement threshold ("NO" branch of 316) or in response to determining that the character string is in lexicon 7 ("YES" branch of 315), IME module 6 may output the word delimiter for display at UI device 4 (318) and wait to receive additional user input indications (302).

However, in response to determining that the score of the top-ranked candidate string is below the auto-replacement threshold ("YES" branch of 316), IME module 6 may output, for display at UI device 4, the top-ranked candidate string in place of the relevant character string for the top-ranked candidate string (320). For example, if the relevant character string for the top-ranked candidate string is "thesa" and the top-ranked candidate string is "thesaurus," IME module 6 may replace "thesa" with "thesaurus." After replacing the relevant character string with the top-ranked candidate string, IME module 6 may output the word delimiter for display at UI device 4 (318). IME module 6 may then wait to receive an additional user input indication (302). In this way, when a character sequence entered by a user is not in lexicon 7, IME module 6 may make a choice between auto-correction to an in-lexicon character string that is closest to the positions indicated by the user input indications or deem that the character sequence is an out-of-lexicon word and leave the character sequence as it is.

In response to determining that the user input indication corresponds to a selection of one of suggestion elements 20 ("YES" branch of 304), IME module 6 may output, for display at UI device 4, the candidate string of the selected suggestion element in place of the relevant character string for the candidate string of the selected suggestion element (322). After replacing the relevant character string, IME module 6 may wait to receive an additional user input indication (302).

Figure 7:
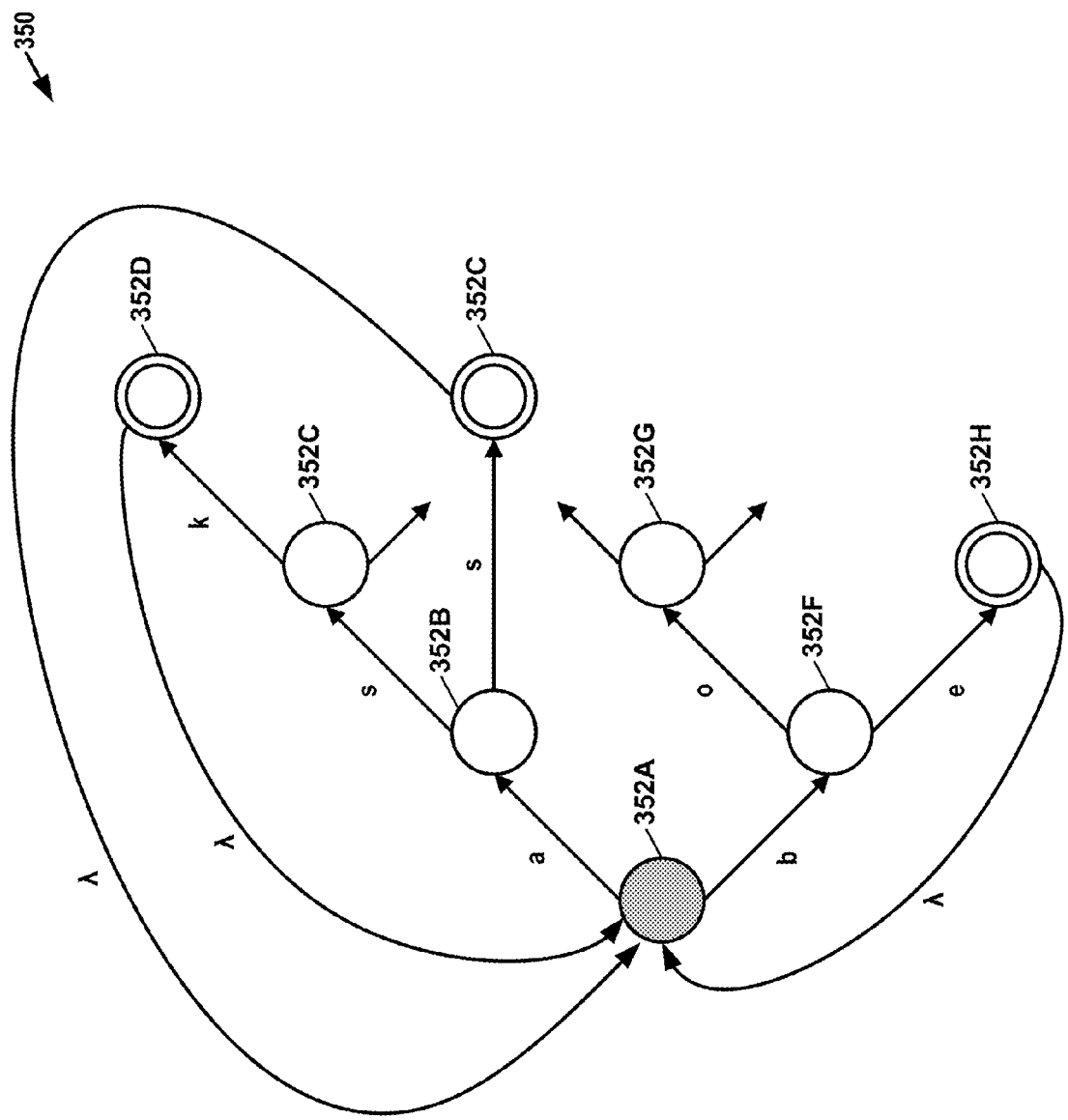
FIG. 7 is a conceptual diagram illustrating an example lexicon finite state transducer (FST), in accordance with one or more aspects of the present disclosure.
Figure 8A:
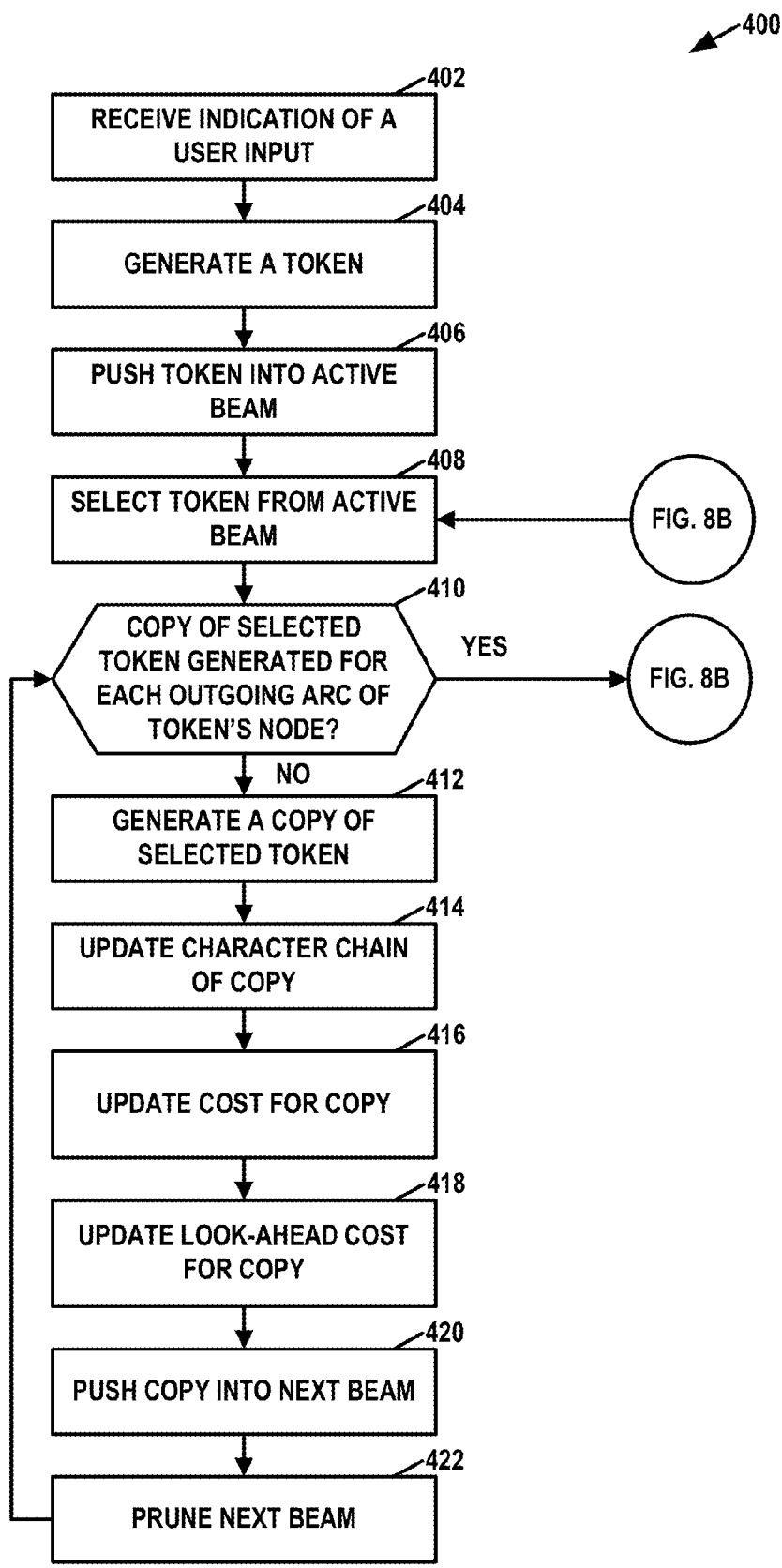
FIGS. 8A and 8B are flowcharts illustrating an example operation of the computing device for determining scores for a set of in-lexicon character strings, in accordance with one or more aspects of the present disclosure.
Figure 8B:
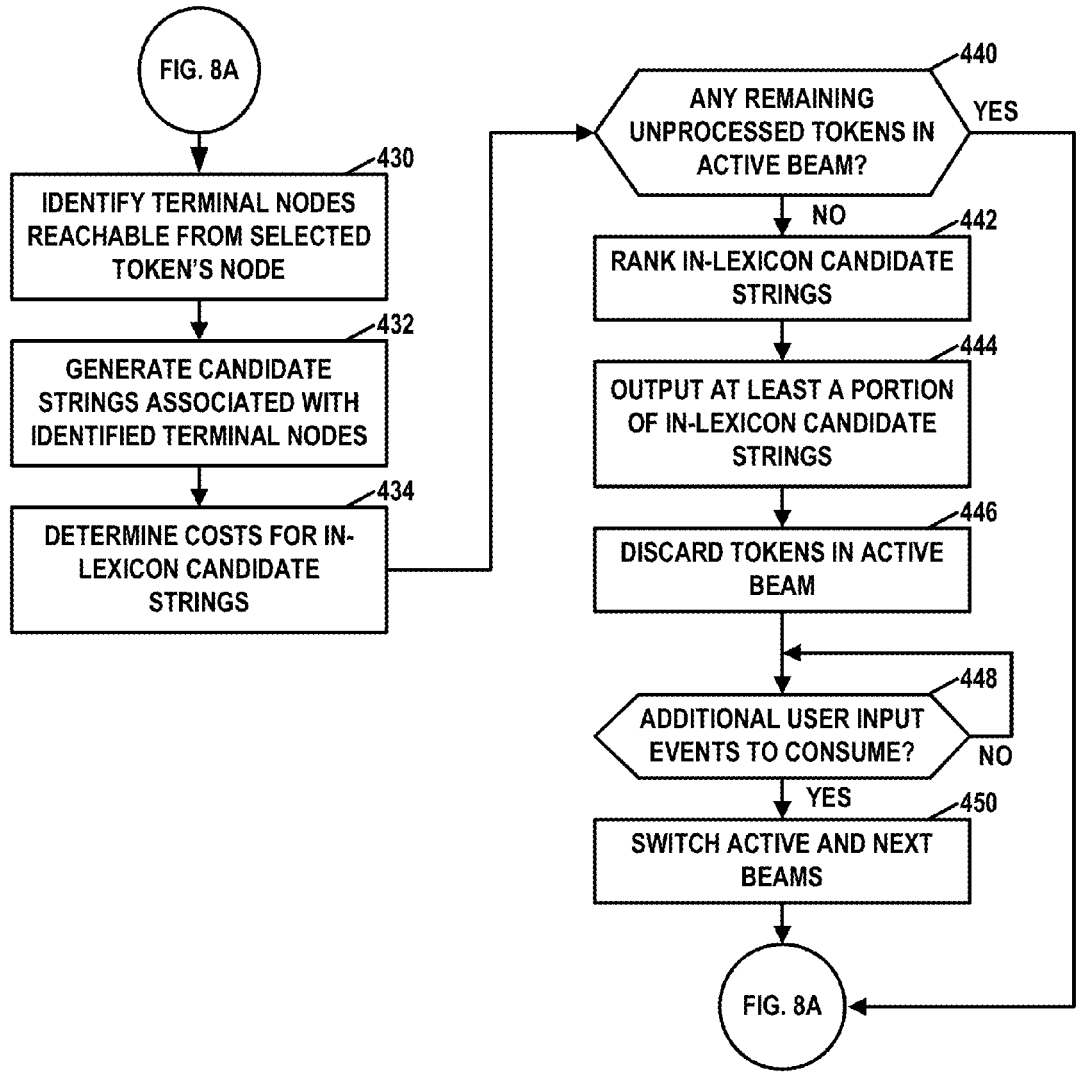

FIG. 7 is a conceptual diagram illustrating an example lexicon finite state transducer (FST) 350, in accordance with one or more aspects of this disclosure. Word-level module 152 may use a lexicon FST, such as lexicon FST 350, to determine a set of one or more in-lexicon candidate strings and scores of the in-lexicon candidate strings. FIGS. 8A and 8B, described below, illustrate an example operation of word-level module 152 to use a lexicon FST to determine the set of in-lexicon candidate strings and the scores of the in-lexicon candidate strings. Lexicon FST 350 includes a plurality of nodes 352A-352H (collectively, nodes 352) and a plurality of arcs. Lexicon FST 350 may include many more nodes and arcs than shown in the example of FIG. 7. The additional nodes and arcs are omitted from FIG. 7 for the sake of clarity.

Lexicon FST 350 may include an entry node, a plurality of non-terminal nodes, and a plurality of terminal nodes. In the example of FIG. 7, node 352A is an entry node and nodes 352D, 352F, and 352H are terminal nodes. Nodes 352B, 352C, 352F, and 352G are non-terminal nodes. In the example of FIG. 7, nodes are represented by circles, arcs are represented by arrows, terminal nodes are represented by double circles, and entry node 352A is shaded.

Each node other than entry node 352A may have exactly one incoming arc and at least one outgoing arc. An incoming arc of a node may be an arc that leads from another one of the nodes to the node. An outgoing arc of a node may be an arc that leads from the node to another one of the nodes. A node is referred to herein as a child node of another node if there is an arc that leads from the other node to the node. Each of the arcs may have a character. In the example of FIG. 7, the characters of arcs are shown next to the arcs. The character of an arc may be an alphanumeric character and/or a word delimiter.

Each of the terminal nodes (e.g., nodes 352D, 352E, and 352H) may be associated with a character string that includes one or more words in lexicon 7. Each of the terminal nodes may be reached from the entry node by following a series of one or more arcs through lexicon FST 350 from entry node 352A to the terminal node. The character string associated with a terminal node is the concatenation of the characters of the arcs leading from entry node 352A to the terminal node. For instance, in the example of FIG. 7, the character string associated with terminal node 352D is "ask" because the characters of the arcs leading from entry node 352A to terminal node 352D are "a," "s," and "k."

FIG. 8A is a flowchart illustrating an example operation 400 of computing device 2 for determining scores for a set of in-lexicon character strings, in accordance with one or more aspects of this disclosure. Word-level module 152 of IME module 6 may perform operation 400 to determine the set of in-lexicon characters strings as part of IME module 6 determining the combined set of candidate strings and associated scores in action 310 of FIG. 6.

Word-level module 152 may receive an indication of a user input (402). In other words, word-level module 152 may receive a user input indication. The user input indication may indicate a position or movement of an input object, such as a finger or stylus.

In response to receiving the user input indication, word-level module 152 may generate a token that is associated with entry node 352A of lexicon FST 350 (404). A token may be a data structure that stores several pieces of data. Word-level module 152 may push the token into an active beam (406). In the context of this disclosure, a beam may be a data structure, such as a stack, that stores tokens. The token may include a score and a character chain. The score of a token may indicate a score associated with following arcs from entry node 352A of lexicon FST 350 to the node associated with the token. The character chain of a token may indicate the characters of the arcs from entry node 352A of lexicon FST 350 to the node associated with the token.

After pushing the token into the active beam, word-level module 152 may select a token from the active beam (408). Word-level module 152 may then determine whether a copy of the selected token has been generated for each outgoing arc of the node associated with the selected token (410). For ease of explanation, this disclosure may describe the node associated with a token as the token's node. If word-level module 152 determines that a copy of the selected token has not yet been generated for an outgoing arc of the token's node ("NO" branch of 410), word-level module 152 may generate a copy of the selected token and may associate the copy with the child node at the opposite end of the outgoing arc (412).

After generating the copy of the token, word-level module 152 may update the character chain of the copy to append the character associated with the arc from the selected token's node to the copy's node (414). In addition, word-level module 152 may update the score of the copy by adding the copy's score to a score of the arc from the selected token's node to the copy's node (416).

Word-level module 152 may determine the score of the arc in various ways. In some examples, word-level module 152 may determine the score associated with the arc based at least in part on a character-level score for the arc. IME module 6 may use a character-level FST to determine the character-level score for the arc. The character-level FST may be an FST like the lexicon FST described above.

A character-level FST may include a plurality of nodes connected by arcs. Each of the arcs may have a character. In this example, word-level module 152 may determine the character-level score for a character chain by following a path through the nodes of the character-level FST and summing the scores of arcs along the path. The characters of the arcs on the path may match the characters of the copy's character chain. Word-level module 152 may determine the score of an arc in the character-level FST based at least in part on a spatial model score for the arc and a character-level LM score for the arc. For instance, word-level module 152 may determine the score of an arc as the sum of the spatial model scores of the arc and the character-level LM score of the arc.

The spatial model score for an arc in the character-level FST may correspond to a probability that a user input indication corresponds to the arc's character. For example, if the user input indication corresponds to a tapping gesture at a particular location, the spatial model score for the arc may be correlated with a spatial distance between the particular location and the virtual key for the arc's character. In this example, if the particular location is further from the virtual key for the arc's character, the probability that the user input indication corresponds to the arc's character diminishes and the arc's spatial model score increases. Conversely, if the particular location is closer to the virtual key for the arc's character, the probability that the user input indication corresponds to the arc's character increases and the arc's spatial model score decreases.

The character-level LM score for an arc in the character-level FST may indicate a probability of the arc's character given the characters of the preceding arcs in the path. For instance, if the arc's character does not typically follow the character of the preceding arc of the path, the arc's character-level LM score may be high. For example, the character "k" does not typically follow the character "f" in the English language. Accordingly, in this example, the character-level LM score of an arc associated with the character "k" may be high if the preceding arc's character is "f."

The lambda character may be an input character or an output character for some arcs in the character-level FST. No user input indications are consumed by transitioning along an arc if the lambda character is the input character of the arc. The character-level FST may use an arc that has a particular character as the input character and the lambda character as the output character to model a string that includes the particular character by accident. IME module 6 does not add any characters to a token's character chain by transitioning along an arc that has the lambda character as the output character of the arc. The character-level FST may model a string that includes an inadvertently omitted character by following an arc that has the lambda character as the input character and the omitted character as the output character. In this way, arcs with lambda input or output characters may enable the character-level FST to model character strings where the user inadvertently omitted or inserted a character, such as an alphanumeric character, space character, or punctuation mark.

In the example of FIG. 8A, word-level module 152 may, in addition to modifying the score of the copy in action 514, update a look-ahead score for the copy (418). Word-level module 152 may determine the look-ahead score for the copy in various ways. For example, word-level module 152 may determine the look-ahead score of the copy by determining a trial look-ahead score for each terminal node in lexicon FST 350 that is reachable from the copy's node. A terminal node is reachable in lexicon FST 350 from the copy's node if there is a path through lexicon FST 350 from the copy's node to the terminal node that does not pass through entry node 352A. Word-level module 152 may set the look-ahead score of the copy to be the lowest of the trial look-ahead scores. In another example, word-level module 152 may set the look-ahead score of the copy to be the highest of the trial look-ahead scores.

Word-level module 152 may determine a trial look-ahead score for a terminal node by adding a spatial score for the terminal node and a language score for the terminal node. The spatial score for the terminal node may be based at least in part on the difference between the number of characters in the copy's character chain and the number of characters in the word associated with the terminal node. The language score for the terminal node may be based at least in part on a probability of the terminal node's character string, given up to n preceding word-delimited character strings, where n is a non-negative integer.

As indicated above, word-level module 152 may generate a copy of the selected token and may update the content of the selected token. Furthermore, word-level module 152 may push the copy of the selected token into a next beam (420). After pushing the copy into the next beam, word-level module 152 may prune the next beam (422). In some examples, word-level module 152 may prune the next beam based at least in part on the scores and look-ahead scores of the tokens in the next beam. Word-level module 152 may discard any tokens in the next beam that are not among the n tokens having the lowest combined scores, where n is an integer (e.g., 10). The combined score of a token may be the score of the token plus the look-ahead score of the token. If there are fewer than n tokens in the next beam, word-level module 152 does not discard any tokens in the next beam.

After pruning the next beam, word-level module 152 may determine again whether copies of the selected token have been generated for each outgoing arc of the selected token's node (410). If not, word-level module 152 may repeat actions 412-422 for another outgoing arc of the selected token's node. In this way, word-level module 152 may generate a copy of the selected token for each outgoing arc of the selected token's node. On the other hand, in response to determining that copies have been generated for each outgoing arc of the selected token's node ("YES" branch of 410), word-level module 152 may perform the portion of operation 400 illustrated in FIG. 8B.

FIG. 8B is a flowchart illustrating an example continuation of operation 400. Word-level module 152 may identify terminal nodes of lexicon FST 350 that are reachable from the selected token's node without passing through entry node 352A of lexicon FST 350 (430). In some examples, word-level module 152 may identify the terminal nodes of lexicon FST 350 that are reachable from the selected token's node after word-level module 152 determines that copies of the selected token have been generated for each outgoing arc of the selected token's node. If the selected token's node is a terminal node, the selected token's node may be the only reachable terminal node.

Word-level module 152 may generate a candidate string associated with each of the identified terminal nodes (432). Word-level module 152 may generate an in-lexicon candidate string associated with a terminal node by concatenating to the selected token's character string the characters of arcs of lexicon FST 350 on a path from the selected token's node to the terminal node. For example, if the selected token's character string is "hap" and the characters of the arcs on the path from the selected token's node to the terminal node are "p" and "y," word-level module 152 may generate the candidate string "happy." In this way, where a particular token in an active beam is associated with a particular node of lexicon FST 350, a candidate string may include a word that is associated with a terminal node of lexicon FST 350 that is reachable from the particular node.

Furthermore, word-level module 152 may determine scores for the generated in-lexicon candidate strings (434). Word-level module 152 may determine the score for an in-lexicon candidate string by adding the selected token's score to a look-ahead score for the terminal node associated with the in-lexicon candidate string. Word-level module 152 may determine the look-ahead score for the in-lexicon candidate string by adding a spatial score for the terminal node associated with candidate string and a language score for the terminal node associated with the candidate string. As indicated above, the spatial score for the terminal node may be based at least in part on the difference between the number of characters in the copy's character chain and the number of characters in the word associated with the terminal node. The language score for the terminal node may be based at least in part on a probability of the terminal node's word, given up to n preceding words, where n is a non-negative integer. In this example, word-level module 152 may rank candidate strings with low score higher than candidate strings with high scores.

After determining the scores for the in-lexicon candidate strings, word-level module 152 has finished processing the selected token. Word-level module 152 may determine whether there are any remaining unprocessed tokens in the active beam (440). If there are one or more remaining unprocessed tokens in the active beam ("YES" branch of 440), word-level module 152 may select another token from the active beam (408) (FIG. 8A) and repeat actions 410-436 using this selected token. In this way, word-level module 152 may process each token in the active beam. After processing each token in the active beam, there are no remaining unprocessed tokens in the active beam.

If there are no remaining unprocessed tokens in the active beam ("NO" branch of 440), word-level module 152 may rank the in-lexicon candidate strings (442). Word-level module 152 may rank the in-lexicon candidate strings based at least in part on the total scores of the in-lexicon candidate strings. After ranking the in-lexicon candidate strings, word-level module 152 may output, to combined prediction module 156, at least a portion of the set of in-lexicon candidate strings (444). For instance, word-level module 152 may output the top n-ranked in-lexicon candidate strings, where n is a positive integer, such as 10. Word-level module 152 may then discard the tokens in the active beam (446).

In addition, word-level module 152 may determine whether there are any additional user input indications to consume (448). If there are no additional user input indications to consume ("NO" branch of 448), word-level module 152 may suspend operation 400 until there are one or more user input indications to consume. On the other hand, if there are one or more user input indications to consume ("YES" branch of 448), word-level module 152 may switch the active beam and the next beam (450). Thus, the active beam is designated as the next beam and the next beam is designated as the active beam. Word-level module 152 may then select a token from the active beam (408) and repeat actions 410-434 using this selected token.

In this way, word-level module 152 may determine the score for a particular in-lexicon candidate string, by determining, based at least in part on the locations indicated by the indications of user input, a spatial score for the particular in-lexicon candidate string. In addition, decoder module 46 may determine a word-level LM score for the particular in-lexicon candidate string. The word-level LM score for the particular in-lexicon candidate string may be based at least in part on a probability of the particular in-lexicon candidate string occurring, given up to n character strings that precede the particular in-lexicon character string, where n is a non-negative integer. Word-level module 152 may determine, based at least in part on a number of arcs between a current node of the lexicon FST and a terminal node of the lexicon FST that corresponds to the particular in-lexicon candidate string, a look-ahead score for the particular candidate string. Word-level module 152 may determine, based at least in part on the spatial score, the word-level LM score, and the look-ahead score, the score for the particular in-lexicon candidate string.

Figure 9:
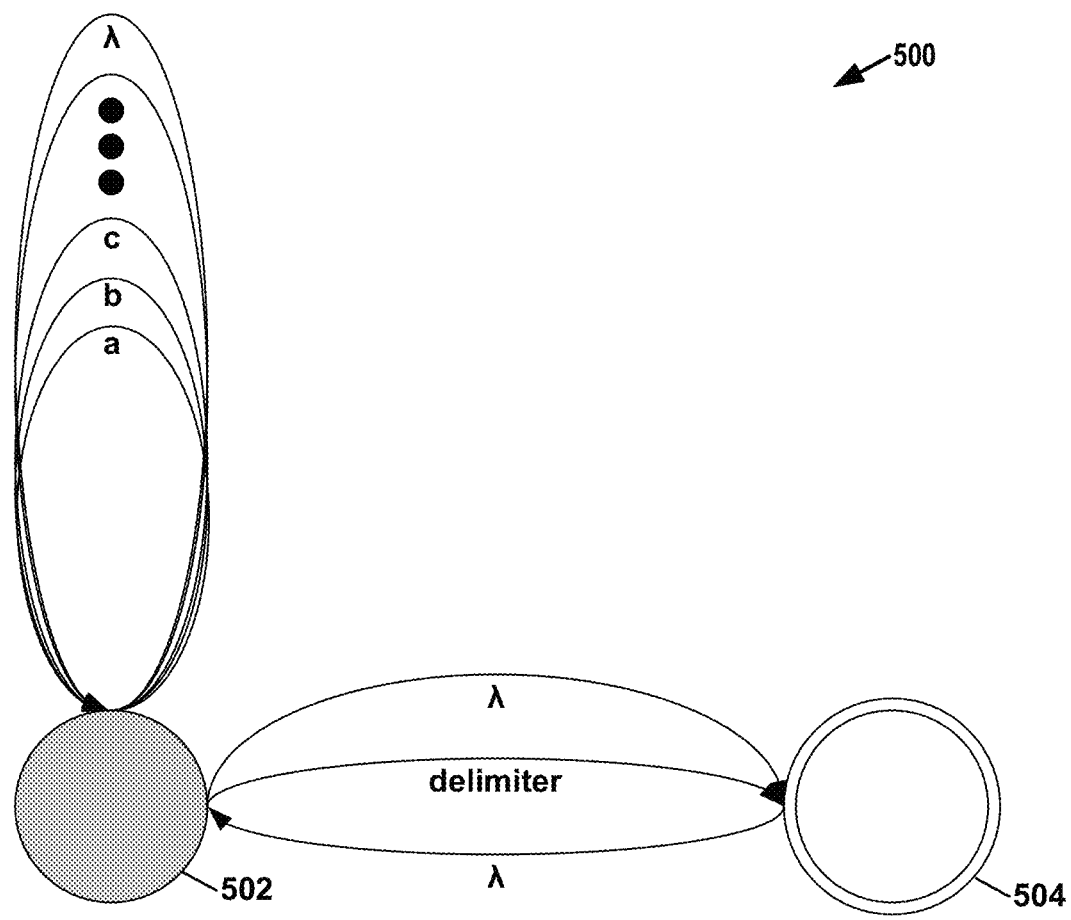
FIG. 9 is a conceptual diagram illustrating an example character-level finite state transducer (FST), in accordance with one or more aspects of the present disclosure.
Figure 10:
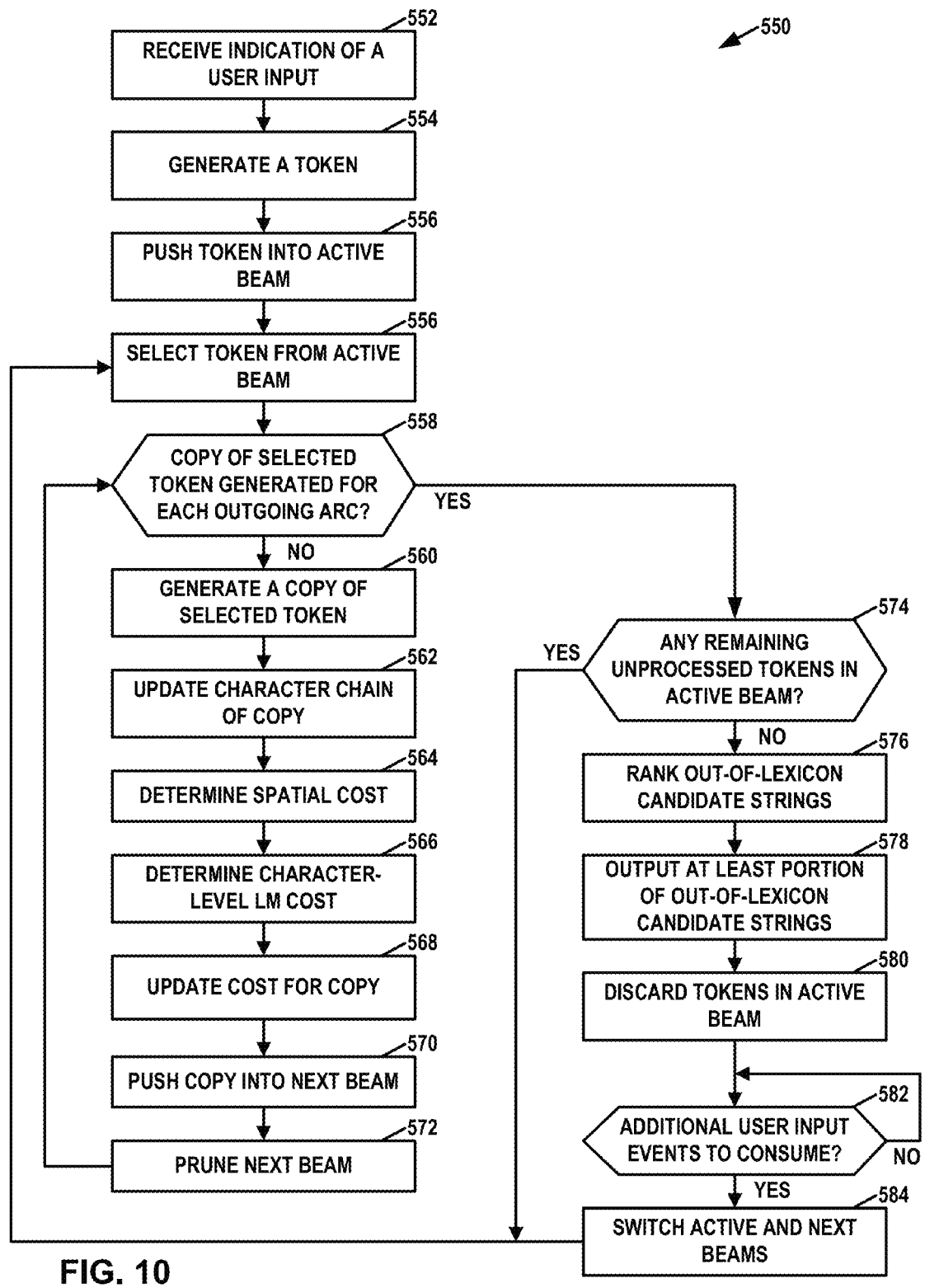
FIG. 10 is a flowchart illustrating an example operation of the computing device for determining scores for a set of out-of-lexicon character strings, in accordance with one or more aspects of the present disclosure.

FIG. 9 is a conceptual diagram illustrating an example character-level FST 500, in accordance with one or more aspects of this disclosure. Character-level module 154 may use a character-level FST, such a character-level FST 500, to determine a set of one or more out-of-lexicon character strings and associated scores. FIG. 10, described below, illustrates an example operation of character-level module 154 to use character-level FST 500 to determine the set of out-of-lexicon character strings and associated scores.

Character-level module 154 may use character-level n-grams. This is a tree based data structure that encodes how likely different letter sequences (of length up to n) are without explicitly modeling whether the sequence is a valid dictionary (lexicon) word. A similar trie (e.g., character-level FST 500) to the one used for storing the word lexicon can be used to store the character level n-grams. One difference between lexicon FST 350 and character-level FST 500 is that the character-level LM (i.e., character-level FST 500) may allow any character to follow any context. More specifically, the character-level LM may encode the probability of the currently typed letter (Li) conditioned on the past n letters.

Character-level FST 500 includes an entry node 502 and a terminal node 504. Like lexicon FST 350, character-level FST 500 includes a plurality of arcs, represented in FIG. 9 as arrows. Each arc of character-level FST 500 is associated with a character. As shown in FIG. 9, character-level FST 500 includes arcs loop back to entry node 502. Although not shown in FIG. 9 for the sake of clarity, character-level FST 500 may include such looped-back arcs for each valid character that is not a word delimiter. In addition, one of the arcs that loops back to entry node 502 may be associated with the lambda character. Furthermore, character-level FST 500 includes an arc from entry node 502 to terminal node 504 that is associated with a word delimiter character and another arc from entry node 502 to terminal node 504 that is associated with the lambda character. Character-level FST 500 may also include an arc from terminal node 504 to entry node 502 that is associated with the lambda character.

FIG. 10 is a flowchart illustrating an example operation 550 of computing device 2 for determining a set of out-of-lexicon character strings, in accordance with one or more aspects of this disclosure. Character-level module 154 may perform operation 550 as part of IME module 6 determining the combined set of candidate strings and associated scores in action 310 of FIG. 6.

As illustrated in the example of FIG. 10, character-level module 154 may receive an indication of a user input (552). In other words, character-level module 154 may receive a user input indication. The user input indication may indicate a position or movement of an input object, such as a finger or stylus.

In response to receiving the user input indication, character-level module 154 may generate a token that is associated with entry node 502 of character-level FST 500 (554). As in operation 400, the token may be a data structure that includes a score and a character chain. The score of the token may indicate a score associated with following a series of arcs through character-level FST 500. The character chain of the token may indicate the characters of the arcs followed through character-level FST 500.

Character-level module 154 may push the token onto an active beam (556). As before, a beam may be a data structure that stores tokens. The active beam of operation 550 may be separate from the active beam of operation 400.

After pushing the token onto the active beam, character-level module 154 may select a token from the active beam (556). Character-level module 154 may then determine whether a copy of the selected token has been generated for each outgoing arc of the node associated with the selected token (558). If character-level module 154 determines that copies of the selected token have not yet been generated for an outgoing arc of the selected token's node ("NO" branch of 558), character-level module 154 may generate a copy of the selected token and associate the copy with the node in character-level FST 500 at the opposite end of the outgoing arc (560).

Furthermore, character-level module 154 may update the character chain of the copy to append to the copy's character chain the character of the outgoing arc (562). For example, if the copy's character chain is "as" and the character of the outgoing arc is "k," character-level module 154 may update the character chain of the copy such that the copy's character chain is "ask."

In addition, character-level module 154 may determine a spatial score for the outgoing arc (564). Character-level module 154 may determine the spatial score of the outgoing arc based at least in part on a spatial distance between a virtual key associated with the outgoing arc's character and the position indicated by the user input indication. Thus, the spatial score of the outgoing arc may be relatively high if the position indicated by the user input indication is relatively distant from the virtual key associated with the outgoing arc's character. Conversely, the spatial score of the outgoing arc may be relatively low if the position indicated by the user input indication is relatively close to the virtual key associated with the outgoing arc's character.

In addition, character-level module 154 may determine a character-level LM score of the outgoing arc (566). Character-level module 154 may determine the character-level LM score based at least in part on the probability of the outgoing arc's character in a particular language, given up to n most-recently added characters in the copy's character chain, where n is a non-negative integer. For example, if the most recently-added character to the copy's character chain is "q," the character-level LM score of the outgoing arc may be relatively high if the outgoing arc's character is "k." However, in this example, if the most-recently added character to the copy's character chain is "q," the character-level LM score of the outgoing arc may be relatively low if the outgoing arc's character is "u." This is because the character "u" frequently follows the character "q" in the English language while the character "k" very seldom follows the character "q" in the English language.

Computing device 2 may receive different patterns of user input indications for different users. For example, computing device 2 may be more likely to receive user input indications associated with a certain combination of characters from one user than another user. Accordingly, character-level module 154 may determine different probabilities of a particular character occurring for different users. Character-level module 154 may determine the probabilities for different users based on characters previously entered by the users. In this way, character-level module 154 may determine, based at least in part on past indications of user input, the probability of a respective character occurring.

In some examples, computing device 2 may output for display a user interface that includes one or more text-entry fields. For example, a user interface for composing an email message may include "to," "cc," "subject," and "body" text-entry fields. In another example, a user interface for an Internet search engine may include a text-entry field for inputting search terms. Computing device 2 may activate a text-entry field in response to an indication of user input to activate the text-entry field. When a text-entry field is activated and computing device 2 receives indications of user input to enter a character string, computing device 2 may output the character string in the activated text-entry field.

Because users input different types of character strings into different types of text-entry fields, character-level module 154 may determine the character-level LM score of an arc differently for different types of text-entry fields. In some examples, character-level module 154 may use character strings previously entered into different types of text-entry fields as a basis for determine the character-level LM scores of arcs for different types of text-entry fields.

In the example of FIG. 10, character-level module 154 does not determine the character-level LM score of the outgoing arc based on any word-level LM or look-ahead score. Rather, the character-level LM score may be entirely based on the probabilities of combinations of characters.

Character-level module 154 may update, based at least in part on the spatial score of the outgoing arc and the character-level LM score of the outgoing arc, the score of the copy (568). In some examples, character-level module 154 may update the score of the copy by adding the spatial score of the outgoing arc and the character-level LM score of the outgoing arc to the existing score of the copy. Thus, the spatial score of the outgoing arc and the character-level LM score of the outgoing arc may be a score for the character of the outgoing arc.

Character-level module 154 may push the copy onto a next beam (570). The next beam used in operation 550 may be separate from the next beam used in operation 400. Character-level module 154 may then prune the next beam (572). Character-level module 154 may prune the next beam based at least in part on the scores of the tokens in the next beam. Character-level module 154 may discard any tokens in the next beam that are not among the n tokens having the lowest scores, where n is an integer (e.g., 10). If there are fewer than n tokens in the next beam, character-level module 154 does not discard any tokens in the next beam.

Character-level module 154 may then determine again whether copies of the selected token have been generated for each outgoing arc of the selected token's node (558). If not, character-level module 154 may repeat actions 560-572 for another outgoing arc of the selected token's node. In this way, character-level module 154 may generate a copy of the selected token for each outgoing arc of the selected token's node.

On the other hand, if character-level module 154 has generated a copy of the selected token for each outgoing arc of the selected token's node ("YES" branch of 558), character-level module 154 may determine whether there are any remaining unprocessed tokens in the active beam (574). In response to determining that there are one or more remaining unprocessed tokens in the active beam ("YES" branch of 574), character-level module 154 may select another token from the active beam (556) and repeat actions 558-572 using this token. In this way, character-level module 154 may process each token in the active beam. After having selected each token in the active beam, there are no remaining unprocessed token in the active beam.

In response to determining that there are no remaining unprocessed tokens in the active beam ("NO" branch of 574), character-level module 154 may rank the out-of-lexicon candidate strings (576). In the example of FIG. 10, the out-of-lexicon candidate strings may be the character chains of the tokens in the next beam. Character-level module 154 may rank the out-of-lexicon candidate strings based at least in part on the scores of the tokens in the next beam. Character-level module 154 may output, to combined prediction module 156, at least a portion of the set of out-of-lexicon candidate strings (578). In some examples, character-level module 154 may output the top n-ranked out-of-lexicon candidate strings, where n is a positive integer, such as 10. Character-level module 154 may then discard the tokens in the active beam (580).

In addition, character-level module 154 may determine whether there are any additional user input indications to consume (582). If there are no additional user input indications to consume ("NO" branch of 582), character-level module 154 may suspend operation 550 until there are more user input indications to consume. On the other hand, if there are one or more user input indications to consume ("YES" branch of 582), character-level module 154 may switch the active beam and the next beam (584). Thus, the active beam is designated as the next beam and the next beam is designated as the active beam. Character-level module 154 may then select another token from the active beam (556).

In this way, character-level module 154 may determine the scores for the set of out-of-lexicon candidate strings at least in part by determining, based at least in part on scores of followed arcs in the character-level FST, a score for a particular candidate string in the second set of candidate strings. The followed arcs of the character-level FST are arcs of the character-level FST that have characters that match the characters of the particular candidate string. For each respective one of the followed arcs, the score of the respective followed arc is based at least in part on a probability of the character of the respective followed arc.

Figure 11:
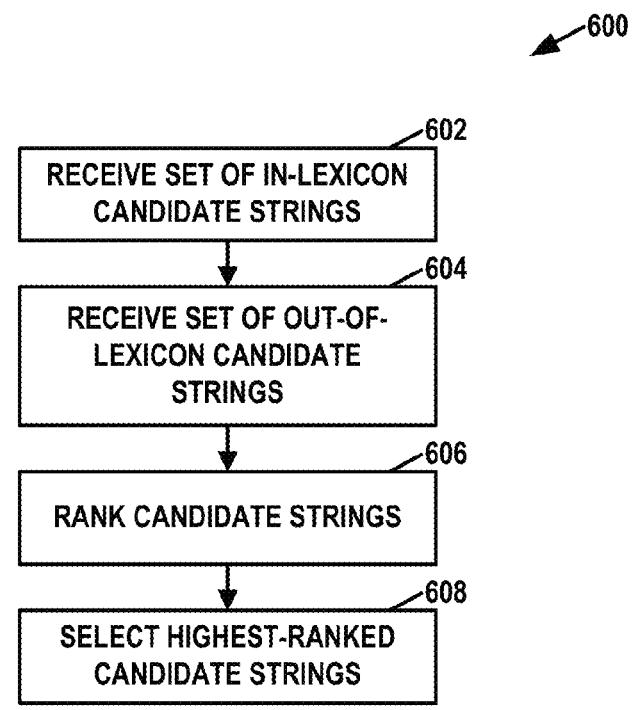
FIG. 11 is a flowchart illustrating an example operation of the computing device for generating a combined set of candidate strings, in accordance with one or more aspects of the present disclosure.

FIG. 11 is a flowchart illustrating an example operation 600 of computing device 2 for generating a combined set of candidate strings. Combined prediction module 156 (FIG. 4) of IME module 6 may perform operation 600 as part of IME module 6 determining the combined set of candidate strings and associated scores in action 310 of FIG. 6.

In the example of FIG. 11, combined prediction module 156 may receive a set of in-lexicon candidate strings and their associated scores from word-level module 152 (602). In addition, combined prediction module 156 may receive a set of out-of-lexicon candidate strings and their associated scores from character-level module 154 (604). In response, combined prediction module 156 may rank, based at least in part on the scores for the in-lexicon candidate strings and the out-of-lexicon candidate strings, the candidate strings in the set of in-lexicon candidate strings and the set of out-of-lexicon candidate strings (606). Combined prediction module 156 may select one or more highest-ranked candidate strings from the in-lexicon and out-of-lexicon sets of candidate strings (608).

Combined prediction module 156 may rank the candidate strings in various ways. For example, combined prediction module 156 may implement an algorithm that learns, based on training data, how to generate an optimal ranking of the combined set of character strings from the in-lexicon candidate strings and the out-of-lexicon candidate strings. The result of this algorithm may be a classifier that determines a final ranking of the combined candidate strings from the in-lexicon and out-of-lexicon candidate strings. In this way, combined prediction module 156 may adapt a machine learning algorithm based on training data and may apply the machine learning algorithm to rank the candidates strings in the in-lexicon and out-of-lexicon candidate strings based at least in part on the scores for the first and second sets of candidate strings.

In another example, combined prediction module 156 may rank the character strings of the combined set of candidate strings based at least in part on a probability that an out-of-lexicon character string follows a preceding character string. For example, combined prediction module 156 may assign a higher rank to an in-lexicon candidate string if the preceding character string is "visited" rather than "should." This is because names of places or people are relatively likely to follow the word "visited" and the names of places and people are relatively less likely to be in lexicon 7. In contrast, verbs typically follow the word "should" and lexicon 7 is likely to include almost all verbs of a language. Accordingly, combined prediction module 156 may rank an out-of-lexicon candidate string higher if the out-of-lexicon candidate string follows the character string "visited" than if the out-of-lexicon candidate string follows the character string "should." In this way, computing device 2 may rank, based at least in part on the scores of the in-lexicon and out-of-lexicon sets of candidate strings and based at least in part on a probability that an out-of-lexicon character strings follows a preceding character string, the candidate strings from the in-lexicon and out-of-lexicon sets of candidate strings, wherein the out-of-lexicon character string is not in the lexicon.

In another example, a user is more likely to enter out-of-lexicon character strings in some types of input fields than in other types of input fields. For example, a user is more likely to enter an out-of-lexicon character string in a search field of an Internet search engine than a state/province field of a mailing address form. Hence, in this example, combined prediction module 156 may give higher priority to in-lexicon candidate strings or to out-of-lexicon candidate strings, depending on which type of input field is active. In this way, combined prediction module 156 may rank, based at least in part on the scores of the sets of in-lexicon and out-of-lexicon candidate strings and based at least in part on a type of an active text field, the candidate strings from the sets of in-lexicon and out-of-lexicon candidate strings. For instance, in response to determining that the active text field is a first type of text field, combined prediction module 156 may assign a first value to relative weights associated with the set of in-lexicon candidate strings. Furthermore, in response to determining that the active text field is a different, second type of text field, combined prediction module 156 may assign a different, second value to the relative weights associated with the set of in-lexicon candidate strings. Combined prediction module 156 may rank, based at least in part on the values of the relative weights associated with the set of in-lexicon candidate strings, the candidate strings from the sets of in-lexicon and out-of-lexicon candidate strings. The relative weights assigned to the in-lexicon candidate strings may increase or decrease the scores of the in-lexicon candidate strings. In other examples, combined prediction module 156 may apply weights or the out-of-lexicon candidate strings.

Figure 12:
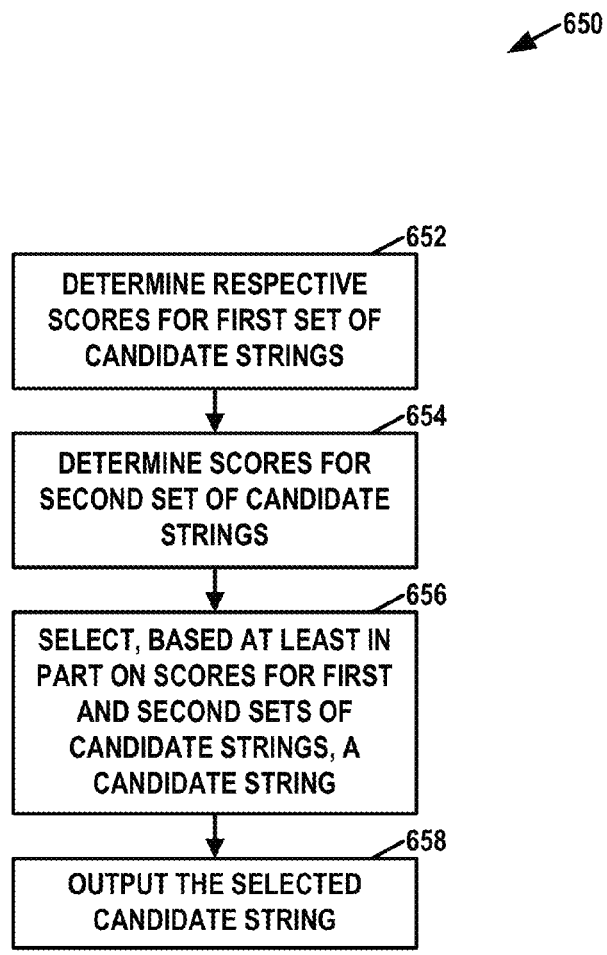
FIG. 12 is a flowchart that illustrates another example operation of a computing device, in accordance with one or more aspects of the present disclosure.

FIG. 12 is a flowchart illustrating another example operation 650 of computing device 2, in accordance with one or more aspects of the present disclosure. In the example of FIG. 12, computing device 2 may determine respective scores for a first set of candidate strings (652). Lexicon 7 may include each candidate string from the first set of candidate strings. Each score for each respective candidate string from the first set of candidate strings is based at least in part on a probability of the respective character string from the first set of candidate strings being entered. In some examples, the probability of the respective character string occurring is based at least in part on one or more words that precede the respective character string.

In addition, computing device 2 may determine scores for a second set of candidate strings (654). Lexicon 7 does not necessarily include each candidate string from the second set of candidate strings. Each score for each respective candidate string from the second set of candidate strings is based at least in part on respective probabilities of characters in the respective candidate string from the second set of candidate strings being entered. In some examples, the probability of a character being entered is based at least in part on one or more characters that precede the character. In at least some examples, the score for the respective candidate string is not based on a probability of the respective candidate string as a whole being entered.

Furthermore, computing device 2 may select, based at least in part on the scores for the first and second sets of candidate strings, a candidate string from among the first and second sets of candidate strings (656). Computing device 2 may output the selected candidate string for display at a display device (658). For example, computing device 2 may output the selected candidate string in one of suggestion elements 20. In another example, computing device 2 may output the selected candidate string as part of text 16. In another example, computing device 2 may automatically replace an already-displayed character string with the selected candidate string.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
   receiving, by a computing device, an indication of user-inputted text;
   storing, by the computing device, a lexicon that includes a set of in-lexicon candidate strings and does not include a set of out-of-lexicon candidate strings, wherein each of the in-lexicon candidate strings and each of the out-of-lexicon candidate strings is a respective word in a particular language;
   for each respective in-lexicon candidate string of the set of in-lexicon candidate strings, determining, by the computing device, a respective score for the respective in-lexicon candidate string, wherein:
      the respective score is based at least in part on a probability of the respective in-lexicon candidate string as a whole being entered, and
      the probability of the respective in-lexicon candidate string being entered is affected by a word-level context of the respective in-lexicon candidate string that includes one or more character strings that precede the respective in-lexicon candidate string in the user-inputted text;
   for each respective out-of-lexicon candidate string of the set of out-of-lexicon candidate strings, determining, by the computing device, a respective score for the respective out-of-lexicon candidate string, wherein the respective score for the respective out-of-lexicon candidate string is based at least in part on respective probabilities of individual characters in the respective out-of-lexicon candidate string being entered and is not based on word-level probabilities;
   determining, by the computing device and based at least in part on the scores for the in-lexicon candidate strings and the scores for the out-of-lexicon candidate strings, a combined set of candidate strings from the set of in-lexicon candidate strings and the set of out-of-lexicon candidate strings, the combined set of candidate strings including at least one in-lexicon candidate string from the set of in-lexicon candidate strings and at least one out-of-lexicon candidate string from the set of out-of-lexicon candidate strings;
   outputting, by the computing device, at least a portion of the combined set of candidate strings for display; and
   responsive to an indication of a selection of a candidate string from the combined set of candidate strings, outputting, by the computing device, for display in place of the user-inputted text, the selected candidate string.

2. The method of claim 1, wherein for a particular character of a particular out-of-lexicon candidate string from the set of out-of-lexicon candidate strings, a probability of the particular character being entered is based at least in part on one or more characters that precede the particular character in the particular out-of-lexicon candidate string.

3. The method of claim 1, further comprising, for each respective out-of-lexicon candidate string of the set of out-of-lexicon candidate strings, determining, by the computing device and based at least in part on past indications of user input, the probabilities of the individual characters in the respective out-of-lexicon candidate string being entered.

4. The method of claim 1, wherein:
   for each respective in-lexicon candidate string from the set of in-lexicon candidate strings, the respective score for the respective in-lexicon candidate string is based at least in part on locations indicated by indications of user input and based at least in part on the probability of the respective in-lexicon candidate string being entered; and
   for each respective out-of-lexicon candidate string from the set of out-of-lexicon candidate strings, the respective score for the respective out-of-lexicon candidate string is based at least in part on the locations indicated by the indications of user input and is based at least in part on the respective probabilities of the individual characters in the respective out-of-lexicon candidate string.

5. The method of claim 4, further comprising responsive to an indication of an additional indication of user input:
   re-determining, by the computing device, the scores for the in-lexicon candidate strings;
   re-determining, by the computing device, the scores for the out-of-lexicon candidate strings;
   re-selecting, by the computing device and based at least in part on the scores for the in-lexicon candidate strings and the out-of-lexicon candidate strings, a candidate string from among the set of in-lexicon candidate strings and the set of out-of-lexicon candidate strings; and
   outputting, by the computing device, the re-selected candidate string for display.

6. The method of claim 4, wherein at least one of the indications of user input indicates a location that does not correspond to a virtual key associated with a character in a selected character string.

7. The method of claim 4, wherein the indications of user input comprise an indication of a sliding gesture at a portion of a display device that displays a virtual keyboard.

8. The method of claim 1, wherein:
determining the combined set of candidate strings comprises:
ranking, by the computing device and based at least in part on the scores for the in-lexicon candidate strings and the scores for the out-of-lexicon candidate strings, candidate strings in the set of in-lexicon candidate strings and the set of out-of-lexicon candidate strings; and
selecting, by the computing device, a highest-ranked candidate string from the in-lexicon candidate strings and the out-of-lexicon candidate strings.

9. The method of claim 8, wherein:
the method further comprises adapting, by the computing device and based at least in part on training data, a machine learning algorithm; and
ranking the candidate strings comprises applying, by the computing device, the machine learning algorithm to rank the candidate strings based at least in part on the scores for the in-lexicon candidate strings and the scores for the out-of-lexicon candidate strings.

10. The method of claim 8, wherein ranking the candidate strings comprises ranking, by the computing device and based at least in part on the scores of the first in-lexicon candidate strings and the scores for the out-of-lexicon candidate strings, and based at least in part on a probability that an out-of-lexicon character string follows a preceding character string, the candidate strings, wherein the out-of-lexicon character string is not in the lexicon.

11. The method of claim 8, wherein ranking the candidate strings comprises ranking, by the computing device and based at least in part on the scores of the in-lexicon candidate strings and the scores for the out-of-lexicon candidate strings and based at least in part on a type of an active text field, candidate strings in the set of in-lexicon candidate strings and the set of out-of-lexicon candidate strings.

12. The method of claim 11, wherein ranking the candidate strings comprises:
responsive to determining that the active text field is a first type of text field, assigning, by the computing device, a first value to relative weights associated with in-lexicon candidate strings;
responsive to determining that the active text field is a different, second type of text field, assigning, by the computing device, a different, second value to the relative weights associated with the in-lexicon candidate strings; and
ranking, by the computing device and based at least in part on the values of the relative weights associated with the in-lexicon candidate strings, the candidate strings in the set of in-lexicon candidate strings and the set of out-of-lexicon candidate strings.

13. The method of claim 1, wherein outputting at least a portion of the combined set of candidate strings comprises outputting, by the computing device and for display, a selected candidate string in place of another already-displayed character string.

14. The method of claim 1, wherein determining the combined set of candidate strings comprises selecting, by the computing device and based at least in part on the scores for the in-lexicon candidate strings and the scores for the out-of-lexicon candidate strings, a plurality of candidate strings from among the set of in-lexicon candidate strings and the set of out-of-lexicon candidate strings;
wherein outputting at least a portion of the combined set of candidate strings comprises outputting, by the computing device and for display, the plurality of candidate strings; and
the method further comprising:
determining, by the computing device, that an indication of user input corresponds to a selection of a particular candidate string from the plurality of candidate strings; and
outputting, by the computing device and for display, the particular candidate string in an active text area of a graphical user interface.

15. The method of claim 1, wherein:
a finite state transducer (FST) includes arcs that correspond to characters; and
determining the scores for the out-of-lexicon candidate strings comprises determining, by the computing device and based at least in part on scores associated with followed arcs in the FST, a score for a particular out-of-lexicon candidate string in the set of out-of-lexicon candidate strings, wherein the followed arcs of the FST are arcs of the FST that correspond to characters of the particular out-of-lexicon candidate string, wherein for each respective one of the followed arcs, the score that corresponds to the respective followed arc is based at least in part on a probability of the character that corresponds to the respective followed arc.

16. The method of claim 1, wherein:
a finite state transducer (FST) includes arcs that correspond to characters and terminal nodes that correspond to character strings in the lexicon; and
determining the scores for the in-lexicon candidate strings comprises:
determining, by the computing device and based at least in part on locations indicated by indications of user input, a spatial score for a particular candidate string in the lexicon;
determining, by the computing device, a word-level language model (LM) score for the particular candidate string, wherein the word-level LM score for the particular candidate string is based at least in part on a probability of the particular candidate string given one or more character strings that precede an insertion point;
determining, by the computing device and based at least in part on a number of arcs between a current node of the FST and a terminal node of the FST that corresponds to the particular candidate string, a look-ahead score for the particular candidate string; and
determining, by the computing device and based at least in part on the spatial score, the word-level LM score, and the look-ahead score, the score for the particular candidate string.

17. A computing device comprising one or more processors configured to:
receive an indication of user-inputted text;
store a lexicon that includes a set of in-lexicon candidate strings and does not include a set of out-of-lexicon candidate strings, wherein each of the in-lexicon candidate strings and each of the out-of-lexicon candidate strings is a respective word in a particular language;

for each respective in-lexicon candidate string of the set of in-lexicon candidate strings, determine a respective score for the respective in-lexicon candidate string, wherein:

the respective score for the respective in-lexicon candidate string is based at least in part on locations indicated by indications of user input and a probability of the respective in-lexicon candidate string as a whole being entered, the probability of the respective in-lexicon candidate string being entered is affected by a word-level context of the respective in-lexicon candidate string that includes one or more words that precede the respective in-lexicon candidate string in the user-inputted text;

for each respective out-of-lexicon candidate string of the set of out-of-lexicon candidate strings, determine a respective score for the respective out-of-lexicon candidate string, wherein:

the respective score for the respective out-of-lexicon candidate string is based at least in part on the locations indicated by the indications of user input and respective probabilities of individual characters in the respective out-of-lexicon candidate string being entered and is not based on word-level probabilities;

determine, based at least in part on the scores for the in-lexicon candidate strings and the out-of-lexicon candidate strings, a combined set of candidate strings from among the set of in-lexicon candidate strings and the set of out-of-lexicon candidate strings, the combined set of candidate strings including at least one in-lexicon candidate string from the set of in-lexicon candidate strings and at least one out-of-lexicon candidate string from the set of out-of-lexicon candidate strings;

output at least a portion of the combined set of candidate strings for display; and responsive to an indication of a selection of a candidate string from the combined set of candidate strings, output, for display in place of the user-inputted text, the selected candidate string.

18. A non-transitory computer-readable storage medium comprising instructions that, when executed by one or more processors of a computing device, configure the computing device to:

receive an indication of user-inputted text;

store a lexicon that includes a set of in-lexicon candidate strings and does not include a set of out-of-lexicon candidate strings, wherein each of the in-lexicon candidate strings and each of the out-of-lexicon candidate strings is a respective word in a particular language;

for each respective in-lexicon candidate string of the set of in-lexicon candidate strings, determine a respective score for the respective in-lexicon candidate string, wherein:

the respective score for the respective in-lexicon candidate string is based at least in part on locations indicated by indications of user input and a probability of the respective in-lexicon candidate string as a whole being entered, and the probability of the respective in-lexicon candidate string being entered is affected by a word-level context of the respective in-lexicon candidate string that includes one or more words that precede the respective in-lexicon character string in the user-inputted text;

for each respective out-of-lexicon candidate string of the set of out-of-lexicon candidate strings, determine a respective score for the respective out-of-lexicon candidate string, wherein:

the respective score for the respective out-of-lexicon candidate string is based at least in part on one or more of the locations indicated by the indications of user input and probabilities of respective individual characters in the respective out-of-lexicon candidate string being entered, for each respective character of the respective out-of-lexicon candidate string, the probability of the respective probability of the respective character being entered is based at least in part on one or more characters that precede the respective character, and the respective score for the out-of-lexicon candidate string is not based on a word-level context of the respective out-of-lexicon candidate string and is not based on word-level probabilities;

generate a combined set of candidate strings including at least one candidate string from the set of in-lexicon candidate strings and at least one candidate string from the set of out-of-lexicon candidate strings, wherein generating the combined set of candidate strings comprises:

ranking, based at least in part on the scores for the in-lexicon candidate strings and the out-of-lexicon candidate strings, candidate strings from the set of in-lexicon candidate strings and the set of out-of-lexicon candidate strings;

selecting, one or more highest-ranked candidate strings from among the set of in-lexicon candidate strings and the set of out-of-lexicon candidate strings; and output the one or more highest-ranked candidate strings for display; and responsive to an indication of a selection of a candidate string from the combined set of candidate strings, output, for display in place of the user-inputted text, the selected candidate string.

* * * * *